(12) United States Patent
Arbitmann et al.

(10) Patent No.: US 8,340,883 B2
(45) Date of Patent: Dec. 25, 2012

(54) METHOD AND APPARATUS FOR PREDICTING A MOVEMENT TRAJECTORY

(75) Inventors: Maxim Arbitmann, Rochester Hills, MI (US); Matthias Schorn, Mühltal (DE); Rolf Isermann, Seeheim (DE); Ulrich Stählin, Eschborn (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 1191 days.

(21) Appl. No.: 12/066,535

(22) PCT Filed: Sep. 15, 2006

(86) PCT No.: PCT/EP2006/066424
§ 371 (c)(1),
(2), (4) Date: Jul. 21, 2008

(87) PCT Pub. No.: WO2007/031580
PCT Pub. Date: Mar. 22, 2007

(65) Prior Publication Data
US 2009/0076702 A1    Mar. 19, 2009

(30) Foreign Application Priority Data

| Sep. 15, 2005 | (DE) | 10 2005 044 199 |
| Sep. 15, 2005 | (DE) | 10 2005 044 200 |
| Sep. 15, 2005 | (DE) | 10 2005 044 204 |
| Jan. 27, 2006 | (DE) | 10 2006 004 174 |
| Jul. 21, 2006 | (DE) | 10 2006 034 254 |
| Jul. 21, 2006 | (DE) | 10 2006 034 255 |
| Aug. 2, 2006 | (DE) | 10 2006 036 363 |

(51) Int. Cl.
*G06F 7/00* (2006.01)

(52) U.S. Cl. ........ 701/96; 701/301; 701/30.9; 701/31.3; 235/439; 702/92; 348/149; 382/106; 382/107

(58) Field of Classification Search ............... 701/96, 701/300–302, 25, 33, 30.9, 31.3, 200; 348/148–149; 340/435–436, 901, 903; 342/69–70; 382/106–107; 235/439; 702/92
See application file for complete search history.

(56) References Cited

U.S. PATENT DOCUMENTS 5,706,195 A * 1/1998 Corby et al. ............... 701/2
(Continued)

FOREIGN PATENT DOCUMENTS
DE        10012737        9/2001
(Continued)

OTHER PUBLICATIONS

Vehicle future trajectory prediction with a DGPS/INS-based positioning system; Jihua Huang; Han-Shue Tan; American Control Conference, 2006; Digital Object Identifier: 10.1109/ACC.2006.1657655; Publication Year: 2006.*

(Continued)

*Primary Examiner* — Cuong H Nguyen

(57) ABSTRACT

In order to be able to undertake a reliable prediction of a movement trajectory of an object moving in road traffic even for relatively long prediction periods, a method is proposed in which there is firstly determined (203) with the aid of an evaluation of a determined movement variable of the object a driving maneuver that is executed by the object. A model $(205_1; \ldots; 205_N)$ of the movement of the object is then selected as a function of the determined driving maneuver, and the movement trajectory of the object is calculated with the aid of the selected model. There is also proposed an apparatus for predicting the movement trajectory of an object that is suitable for carrying out the method. The object can be both a motor vehicle and an object in the surroundings of the motor vehicle.

37 Claims, 12 Drawing Sheets

U.S. PATENT DOCUMENTS

| | | | |
|---|---|---|---|
| 6,889,161 B2 | 5/2005 | Winner et al. | |
| 6,926,374 B2 * | 8/2005 | Dudeck et al. | 303/191 |
| 7,451,005 B2 * | 11/2008 | Hoffberg et al. | 700/83 |
| 2003/0116373 A1 * | 6/2003 | Miller et al. | 180/167 |
| 2004/0090117 A1 * | 5/2004 | Dudeck et al. | 303/191 |
| 2005/0004762 A1 * | 1/2005 | Takahama et al. | 701/301 |
| 2005/0278112 A1 * | 12/2005 | Gern et al. | 701/200 |
| 2007/0083309 A1 * | 4/2007 | Danner et al. | 701/41 |
| 2009/0076702 A1 * | 3/2009 | Arbitmann et al. | 701/96 |
| 2009/0319113 A1 * | 12/2009 | Lee | 701/25 |
| 2010/0082195 A1 * | 4/2010 | Lee et al. | 701/25 |
| 2010/0150056 A1 * | 6/2010 | Iwai et al. | 370/328 |
| 2010/0182432 A1 * | 7/2010 | Augst | 348/148 |
| 2010/0225762 A1 * | 9/2010 | Augst | 348/148 |
| 2011/0046843 A1 * | 2/2011 | Caveney | 701/33 |

FOREIGN PATENT DOCUMENTS

| | | | |
|---|---|---|---|
| JP | 2007537725 X | * | 4/2009 |
| WO | 2004097453 | | 11/2004 |
| WO | 2005014370 | | 2/2005 |
| WO | WO 2007037414 A1 | * | 6/2007 |

OTHER PUBLICATIONS

Prediction of Lane Change Trajectories through Neural Network; Tomar, R.S.; Verma, S.; Tomar, G.S.; Computational Intelligence and Communication Networks (CICN), 2010 International Conference on; Digital Object Identifier: 10.1109/CICN.2010.59; Publication Year: 2010 , pp. 249-253.*

Trajectory Prediction and Data Filtering for Mobile Networks; Reddy, C.P.; Srianirudh, K.T.; Kumar, K.U.; Gondela, H.S.K.; Surendhra, C.V.N.S.; Future Networks, 2009 International Conference on; Digital Object Identifier: 10.1109/ICFN.2009.44 Publication Year: 2009 , pp. 263-267.*

Simultaneous topological map prediction and moving object trajectory prediction in unknown environments; Shu Yun Chung; Han Pang Huang; Intelligent Robots and Systems, 2008. IROS 2008. IEEE/RSJ International Conference on Digital Object Identifier: 10.1109/IROS.2008.4650945; Publication Year: 2008 , pp. 1594-1599.*

A Moving Object Tracked by a Mobile Robot with Real-Time Obstacles Avoidance Capacity; Chung-Hao Chen; Chang Cheng; Page, D.; Koschan, A.; Abidi, M.; Pattern Recognition, 2006. ICPR 2006. 18th International Conference on; vol. 3 Digital Object Identifier: 10.1109/ICPR.2006.106; Publication Year: 2006 , pp. 1091-1094.*

Lane-Change Decision Aid System Based on Motion-Driven Vehicle Tracking; Diaz Alonso, J.; Ros Vidal, E.; Rotter, A.; Muhlenberg, M; Vehicular Technology, IEEE Transactions on; vol. 57 , Issue: 5; Digital Object Identifier: 10.1109/TVT.2008.917220; Publication Year: 2008 , pp. 2736-2746.*

Fast algorithm for pedestrian and group of pedestrians detection using a laser scanner; Gate, G.; Nashashibi, F.; Intelligent Vehicles Symposium, 2009 IEEE; Digital Object Identifier: 10.1109/IVS.2009.5164476; Publication Year: 2009 , pp. 1322-1327.*

Multiple Vehicle Visual Tracking from a Moving Vehicle; Mingxiu Lin; Xinhe Xu; Intelligent Systems Design and Applications, 2006. ISDA '06. Sixth International Conference on; vol. 2; Digital Object Identifier: 10.1109/ISDA.2006.253865 Publication Year: 2006 , pp. 373-378.*

* cited by examiner

METHOD AND APPARATUS FOR PREDICTING A MOVEMENT TRAJECTORY

This application is the U.S. national phase of international application PCT/EP06/66424 filed Sep. 15, 2006, which designated the U.S. and which claims the benefit of priority of German Patent Application Number 10 2006 036 363.9 filed Aug. 2, 2006, German Patent Application 10 206 034 255.0 filed Jul. 21, 2006, German Patent Application 10 2006 034 254.2 filed Jul. 21, 2006, German Patent Application 10 2006 004 174.7 filed Jan. 27, 2005, German Patent Application 10 2005 044 200.5 filed Sep. 15, 2005, German Patent Application 10 2005 044 199.8 filed Sep. 15, 2005 and German Patent Application 10 2005 044 204.8 filed Sep. 15, 2005. The contents of each of the aforementioned documents are incorporated herein in their entirety.

TECHNICAL FIELD

The invention relates to a method for predicting a movement trajectory of an object moving in road traffic. The invention further relates to an apparatus for predicting a movement trajectory of an object moving in road traffic that is suitable for carrying out the method.

BACKGROUND OF THE INVENTION

One goal in the development of motor vehicles is driver assistance systems for accident avoidance. These systems monitor the surroundings of the vehicle, decide whether collision with an object can occur, and interfere in the steering system or the braking system of the vehicle in order to avoid the accident with avoidance or braking. A precondition for deciding whether an accident can happen or not is the prediction of the future position of the object in a period of a few seconds.

Known prediction methods are based on an extrapolation of the detected path of the object. An example of such a method is the Euler extrapolation, in which the position $\vec{x}(t+T)$ of the object at an instant t+T is predicted from the position and the speed at the instant t:

$$\vec{x}(t+T) = \vec{x}(t) + \dot{\vec{x}}(t) \cdot T \tag{1}$$

The polynomial extrapolation is likewise known. Here, it holds in the third degree that, for example, $$\vec{x}(t+T) = \vec{c}_3(t+T)^3 + \vec{c}_2(t+T)^2 + \vec{c}_1(t+T) + \vec{c}_0,$$

the positions $\vec{x}(t-iT)$ detected in the preceding time steps being used to determine the coefficients $\vec{c}_i$. However, it is impossible in many cases to predict the trajectory of the object with sufficient reliability with the aid of such methods. Thus, for example, it is not possible to correctly forecast a stopping maneuver or lane change of the object for long prediction periods, in particular. However, in the case of a lane change the methods generally lead to the prediction of an instance of cornering, and in the case of a stopping maneuver extrapolation yields a future instance of the object driving in reverse.

SUMMARY OF THE INVENTION

It is therefore an object of the present invention to predict the future position of an object moving in road traffic with a higher reliability. In particular, the aim is to enable reliable prediction even for relatively long prediction periods.

According to the invention, this object is achieved by a method and an apparatus for predicting a movement trajectory of an object moving in road traffic.

Accordingly, it is provided that a method of the type mentioned at the beginning is carried out with the aid of the following steps:

determining at least one movement variable of the object,
determining a driving maneuver that is executed by the object with the aid of an evaluation of the determined movement variable,
selecting a model for the movement of the object as a function of the determined driving maneuver, and
calculating the movement trajectory of the object with the aid of the selected model.

Moreover, an apparatus of the type mentioned at the beginning is created that comprises the following devices:

at least one sensor from whose signals it is possible to determine a movement variable of the object,
a driving maneuver detection device that can be used to determine a driving maneuver of the object with the aid of an evaluation of the determined movement variable, and
a prediction device that can be used to calculate the movement trajectory of the object with the aid of a model, it being possible to select the model from a set of models as a function of the determined driving maneuver.

In the case of the invention, a driving maneuver that is executed by the object is advantageously firstly determined. Prediction of the movement trajectory of the object is then performed with the aid of a model that is selected as a function of the determined driving maneuver. It is thereby possible to make respective use of adapted prediction models for various determined driving maneuvers of the object. Accuracy and reliability of the prediction are thereby substantially increased. Here, the term of object is understood, in particular, both as a motor vehicle and as an object in the surroundings of the motor vehicle, in which latter case it can be a further vehicle, for example. The term of movement variable is understood, in particular, as all driving dynamics state variables of an object. By way of example, the term covers the object speed, a yaw angle, a yaw rate, an attitude angle and a steering angle of steerable wheels of the object.

In one embodiment of the method and the apparatus, it is provided that the driving maneuver is selected from a set of prescribed driving maneuvers.

This renders it possible, for example, to select the driving maneuver from a set that typically includes driving maneuvers of motor vehicles in road traffic. The prediction can therefore be adapted to these typical maneuvers.

A further embodiment of the method and the apparatus provides that the determined driving maneuver is composed of a driving maneuver describing the longitudinal movement of the object and a driving maneuver describing the lateral movement of the object.

A prediction that is particularly simple and therefore quick and economical with resources is enabled by such separate consideration of the longitudinal and lateral dynamics of the object.

One refinement of the method and the apparatus provides that the driving maneuver describing the lateral movement of the object is selected from a set that comprises at least an instance of driving straight ahead, an instance of cornering and a lane change.

As a result, consideration is given to the driving maneuvers occurring most frequently in road traffic and, in particular, on a freeway or a motor road, and so it is possible to carry out a model-based prediction for virtually all lateral dynamics maneuvers carried out by an object on such traffic routes.

It has emerged that a distinction can be made between a lane change and an instance of cornering by the object with the aid of a characteristic movement variable that is formed from at least two movement variables of the object. Use is advantageously made in this case of a variable characterizing the change in the movement direction of the object as a first movement variable of the object featuring in the characteristic movement variable. This can be, for example, the yaw rate of the object or a rate of change of the course angle of the object.

Consequently, one refinement of the method and the apparatus is characterized in that a distinction is made between an instance of cornering and a lane change with the aid of a characteristic movement variable that is formed from a first movement variable that characterizes a change in the movement direction of the object, and at least a second movement variable of the object.

Distinguishing between an instance of cornering and a lane change is advantageously enabled by a correlation between the first and the second movement variable. Here, the first movement variable, which can, for example, be a yaw rate or a change of the course angle in particular, specifies the change in the movement direction of the object.

It has been shown, in particular, that a correlation that is characteristic of a lane change, on the one hand, and of an instance of cornering, on the other hand, already exists between a change in the movement direction and the object speed in the initial phase of the driving maneuver.

Consequently, the second movement variable of the object is a speed of the object in one embodiment of the method and of the apparatus.

Moreover, it has emerged that a correlation that is typical of a lane change, on the one hand, and an instance of cornering, on the other hand, already exists between a change in the movement direction and the steering angle at steerable wheels of the object in the initial phase of the driving maneuver.

Consequently, the second movement variable is a steering angle at steerable wheels of the object in a further embodiment of the method and of the apparatus.

A further embodiment of the method and of the apparatus is characterized in that the second movement variable is a steering angle at steerable wheels of the object.

One refinement of the method and of the apparatus is distinguished in that the movement trajectory is determined with the aid of the model as a function of at least one parameter.

In a further development of the method and of the apparatus, it is provided that a position of the object predicted with the aid of the movement trajectory is compared with a detected position of the object, and that the parameter is adapted as a function of the result of the comparison.

Consequently, the prediction results for a later instant can be adapted with the aid of a comparison of the measured position and the prediction for an earlier instant. The prediction for the later instant is thereby further improved.

The invention is suitable, in particular, for predicting the movement trajectories of objects in the surroundings of a motor vehicle. Consequently, one embodiment of the method and of the apparatus is characterized in that the object is an ambient object located in the surroundings of a motor vehicle, the movement variable of the ambient object being determined by means of an ambient sensor of the motor vehicle.

The ambient object can, in particular, be a further motor vehicle in the surroundings of "the driver's own" motor vehicle.

One refinement of the method and of the apparatus is characterized in that the driving maneuver describing the longitudinal movement of the ambient object is determined as a function of a comparison of speeds of the object, present at the successive instants, from a set that comprises at least a steady movement and an instance of emergency braking.

This permits an identification of relevant maneuvers describing the longitudinal movement of the ambient object even when the state of movement of the ambient object can be determined only with a relatively low accuracy—for example because of errors in detection. This is frequently the case when the speed or acceleration of the ambient object has to be determined by means of an ambient sensor with the aid of a comparison of positional data.

A further embodiment of the method and of the apparatus provides that a movement direction of the ambient object is determined at successive instants, and that the driving maneuver describing the lateral movement of the ambient object is determined with the aid of a comparison of course angles determined from the determined movement directions.

In one refinement of the method and of the apparatus, it is provided, furthermore, that the driving maneuver describing the lateral movement of the ambient object is determined with the aid of a comparison of the variable $$(\gamma_{Obj,0}(t) - \gamma_{Obj,0}(t_0)) \cdot v_{Obj,0}$$

with at least one threshold value, $\gamma_{Obj,0}(t)$ denoting the course angle at a stationary coordinate system at an observation instant, $\gamma_{Obj,0}(t_0)$ denoting the course angle at the stationary coordinate system at the beginning of a variation in the course angle, and $v_{Obj,0}$ denoting the speed of the ambient object.

This permits a particularly simple and reliable identification of the driving maneuver executed by an ambient object to be undertaken. The observation instant is understood as the instant or time step in which the course angle $\gamma_{Obj,0}(t)$ has been detected and in which the identification of the driving maneuver is undertaken.

In a further refinement of the method and of the apparatus, a lane change of the ambient object is determined when the course angle of the object changes to a prescribed extent and when the variable $$(\gamma_{Obj,0}(t) - \gamma_{Obj,0}(t_0)) \cdot v_{Obj,0}$$

assumes values within a prescribed interval.

In particular, an evaluation of said variable therefore enables an identification of a lane change as early as in its initial phase.

Moreover, the variable can be used to distinguish lane change from instances of cornering of the ambient object as early as in the initial phase of the maneuver. Consequently, one embodiment of the method and of the apparatus provides that an instance of cornering of the ambient object is determined when the course angle of the object changes to a prescribed extent and when the variable $$(\gamma_{Obj,0}(t) - \gamma_{Obj,0}(t_0)) \cdot v_{Obj,0}$$

assumes values outside the prescribed interval.

Furthermore, one embodiment of the method and of the apparatus is characterized in that the movement trajectory of the ambient object is determined with the aid of a predicted speed of the ambient object and a predicted course angle of the ambient object.

In one refinement of the method and of the apparatus, the movement trajectory of the ambient object is calculated recursively, a position of the ambient object being determined in a prediction step with the aid of the predicted speed and the predicted course angle from the position determined in a preceding prediction step.

Furthermore, in one embodiment of the method and of the apparatus, it is provided that the predicted speed of the ambient object is calculated with the aid of the selected model describing the longitudinal movement of the ambient object.

In addition, one embodiment of the method and of the apparatus provides that the predicted course angle of the ambient object is calculated with the aid of the selected model describing the lateral movement of the ambient object.

One development of the method and of the apparatus is distinguished in that the predicted course angle of the ambient object is calculated in accordance with a sigmoid function when a lane change has been determined as driving maneuver, the shape of the sigmoid function being determined by at least one parameter that is determined as a function of the speed of the ambient object.

Here, a sigmoid or a sigmoid function is understood in the usual sense as an approximately S-shaped, real, continuously differentiable, monotonic and bound function with a point of inflection. Examples of this are functions of the form of a hyperbolic tangent function $f(x)=\alpha\tanh(\beta(x-\gamma))$ a logistical function $f(x)=\alpha/(1+\exp(-\beta(x-\gamma))$ or an arctangent function $f(x)=\alpha\arctan(\beta(x-\gamma))$ with parameters $\alpha,\beta$, $\gamma$ to be determined at least partially dynamically. Such functions can be used to specify the trajectory in a closed fashion. Furthermore, the parameters that determine the shape of the sigmoid can be determined in a simple and efficient way with the aid of a few secondary conditions.

Moreover, in one refinement of the method and of the apparatus the course angle $\gamma_{Obj,0}(t+\Delta t)$, predicted for instant $t+\Delta t$, of the ambient object is calculated by $$\gamma_{Obj,0}(t+\Delta t)=\gamma_{Obj,0}(t)+p\cdot\Delta t$$

when an instance of cornering has been determined as driving maneuver, the variable $\gamma_{Obj,0}(t)$ being the course angle of the ambient object at an observation instant t, $\Delta t$ being a time interval and p being a parameter.

The invention is also particularly suitable for determining the movement trajectory of the driver's own motor vehicle. Consequently, one refinement of the method and of the apparatus provides that the object is the motor vehicle, the movement variable being detected by means of at least one vehicle sensor.

One refinement of the method and of the apparatus is characterized in that the driving maneuver describing the lateral movement of the motor vehicle is determined with the aid of a yaw rate of the motor vehicle and/or with the aid of a steering angle set at steerable wheels of the vehicle.

In one embodiment of the method and of the apparatus, an instance of driving straight ahead of the motor vehicle is determined when the yaw rate of the vehicle and/or the steering angle are/is smaller in absolute terms than a threshold value.

It has further been shown that a correlation that is characteristic of the lateral dynamic driving maneuver of the vehicle, in particular for an instance of cornering, on the one hand, and a lane change, on the other hand, exists between the yaw rate of the motor vehicle and the steering angle. This driving maneuver can be distinguished as early as in its initial phase with the aid of the correlation.

One refinement of the method and of the apparatus therefore provides that an instance of cornering of the motor vehicle is determined when the product of steering angle and yaw rate is grater than a prescribed threshold value, and/or a change in yaw angle during the driving maneuver is greater in absolute terms than a prescribed threshold value.

A further refinement of the method and of the apparatus provides that a lane change of the motor vehicle is determined when no instance of driving straight ahead and no instance of cornering are determined.

In one development of the method and of the apparatus, a lane change is divided into at least three successive phases, the yaw rate of the motor vehicle being greater in absolute terms than a threshold value in a first phase, being smaller in absolute terms than a threshold value in an intermediate phase, and being greater in absolute terms than a threshold value in a second phase, and the yaw rate in the first phase and the second phase having a different sign.

It is likewise advantageously possible to use these phases to distinguish between a lane change and an instance of cornering or of driving straight ahead.

In one embodiment of the method and of the apparatus, it is provided that a maximum duration is prescribed for the first phase, and that after a preceding detection of a lane change an instance of cornering is determined when the duration of the first phase overshoots the maximum duration.

It is thereby possible to correct the identification of the driving maneuver when instead of an instance of cornering a lane change has been determined initially.

A further embodiment of the method and of the apparatus is distinguished in that a minimum duration is prescribed for the first phase, and in that after a preceding detection of a lane change an instance of driving straight ahead is determined when the duration of the first phase undershoots the minimum duration.

It is thereby possible to correct the identification of the driving maneuver when instead of an instance of driving straight ahead a lane change has been determined initially.

In addition, in one refinement of the method and of the apparatus a maximum duration is prescribed for the intermediate phase of the lane change, and after a preceding detection of a lane change an instance of driving straight ahead is determined when the duration of the intermediate phase overshoots the maximum duration.

It is likewise thereby possible to correct the identification of the driving maneuver when instead of one instance of driving straight ahead a lane change has been determined initially.

One embodiment of the method and of the apparatus is characterized in that the movement trajectory of the motor vehicle for the first phase of a lane change is predicted as a function of determined longitudinal and lateral speeds and/or as a function of determined longitudinal and lateral accelerations of the motor vehicle with the aid of an Euler prediction.

Furthermore, one refinement of the method and of the apparatus provides that the movement trajectory of the motor vehicle during the first phase of the lane change is recorded and approximated by a polynomial, and in that the polynomial determined in this case is used to predict the movement trajectory of the motor vehicle for the second phase of the lane change.

It is thereby advantageously possible to use the trajectory during the first phase to predict the movement trajectory for the second phase of the lane change. Thus, during prediction of the second phase consideration is given to the behavior of the vehicle driver during a lane change that has been determined in the first phase of the lane change. This results in a particularly reliable and accurate prediction.

One development of the method and of the apparatus is characterized in that the predicted movement trajectory for the second phase of the lane change corresponds to the determined polynomial that is rotated by 180° about an end point of the first phase of the lane change, and that is applied to the movement trajectory of the motor vehicle in the intermediate phase of the lane change.

Moreover, in one refinement of the method and of the apparatus the polynomial is a third degree polynomial.

On the one hand, such a polynomial permits a sufficiently accurate approximation of the path of the vehicle, while on the other hand the computational outlay for calculating the parameters of the polynomial remains sufficiently low.

In one embodiment of the method and of the apparatus, it is additionally provided that the movement trajectory of the motor vehicle is determined with the aid of a predicted length of a circular arc and a radius of the circular arc when the driving maneuver determined is an instance of cornering.

Furthermore, a method for preventing a collision between a vehicle and an ambient object, or for diminishing the severity of a collision is provided. In the case of the method, movement trajectories of the motor vehicle and/or of the ambient object are determined, the movement trajectory of the motor vehicle and/or the movement trajectory of the ambient object being determined with the aid of a method of the type previously represented. A collision location is determined on the basis of an evaluation of the movement trajectories. Measures preventing collisions and/or diminishing collision consequences are then instituted as a function of the distance from the collision location.

Coming into consideration here as collision avoidance measures are, for example, automatic braking or avoidance maneuvers, as well as the output of warnings to the driver to the effect that the driver takes these measures in order to prevent a collision. In order to diminish the severity of a collision and/or the consequences thereof, it is possible, in particular, to trigger passive safety systems such as, for example, airbags. Likewise suitable for diminishing the severity of a collision is a warning to the driver, who can institute suitable measures for diminishing the severity of a collision on the basis of the warning.

Moreover, the invention and its embodiments are also suitable for use in a so-called ACC (ACC: Adaptive Cruise Control) system that regulates the speed of a motor vehicle such that a prescribed separation between the motor vehicle and a further motor vehicle located ahead of the motor vehicle in the driving direction is not undershot.

Consequently, provision is likewise made of a method for regulating the speed of a motor vehicle, in the case of which the speed of the motor vehicle is set in such a way that a separation between the motor vehicle and a further vehicle located ahead of the motor vehicle in the driving direction of the motor vehicle does not undershoot a prescribed separation value, which method is characterized in that a movement trajectory of the motor vehicle and/or of the further vehicle are/is determined with the aid of a method of the type previously represented, in that a separation between the motor vehicle and the further vehicle is predicted as a function of the movement trajectory, and in that the speed of the motor vehicle is set as a function of the predicted separation.

In particular, it is possible in this way to determine whether the further vehicle is moving into the driving lane of the motor vehicle because of a driving maneuver. If this is the case, the vehicle speed can already be adapted in good time.

Furthermore, a computer program product is provided that defines an algorithm that covers a method of the type previously represented.

Inherent to the invention is the idea of undertaking a model-based prediction of the movement trajectory of an object moving in road traffic, it being possible, in particular, for the object to be a motor vehicle or an object in the surroundings of the motor vehicle. A driving maneuver of the object is initially identified, and the prediction is subsequently carried out with the aid of a model for this driving maneuver. As a result, the path of the object can be reliably predicted, particularly in the case of an instance of cornering and a lane change of the object, something which is not possible with the aid of an extrapolation of the object movement according to the prior art. The driving maneuver is advantageously selected from a set of maneuvers typically executed in road traffic with the aid of a prescribed criterion on the basis of an evaluation of at least one movement variable of the object. Here, a characteristic movement variable can also, in particular, be used to distinguish between an instance of cornering and a lane change as early as in the initial phase of the maneuver.

The prediction results can be used for the purpose of predicting an imminent collision between the vehicle and the object. In the case of an imminent collision, measures can be taken to avoid collision and/or to measures to avoid collision and/or to diminish the collision consequences.

These and other points of view of the invention are also described clearly with the aid of the exemplary embodiments and subsequently with the aid of the figures with regard to the exemplary embodiments.

DESCRIPTION OF EXEMPLARY EMBODIMENTS

Figure 1:
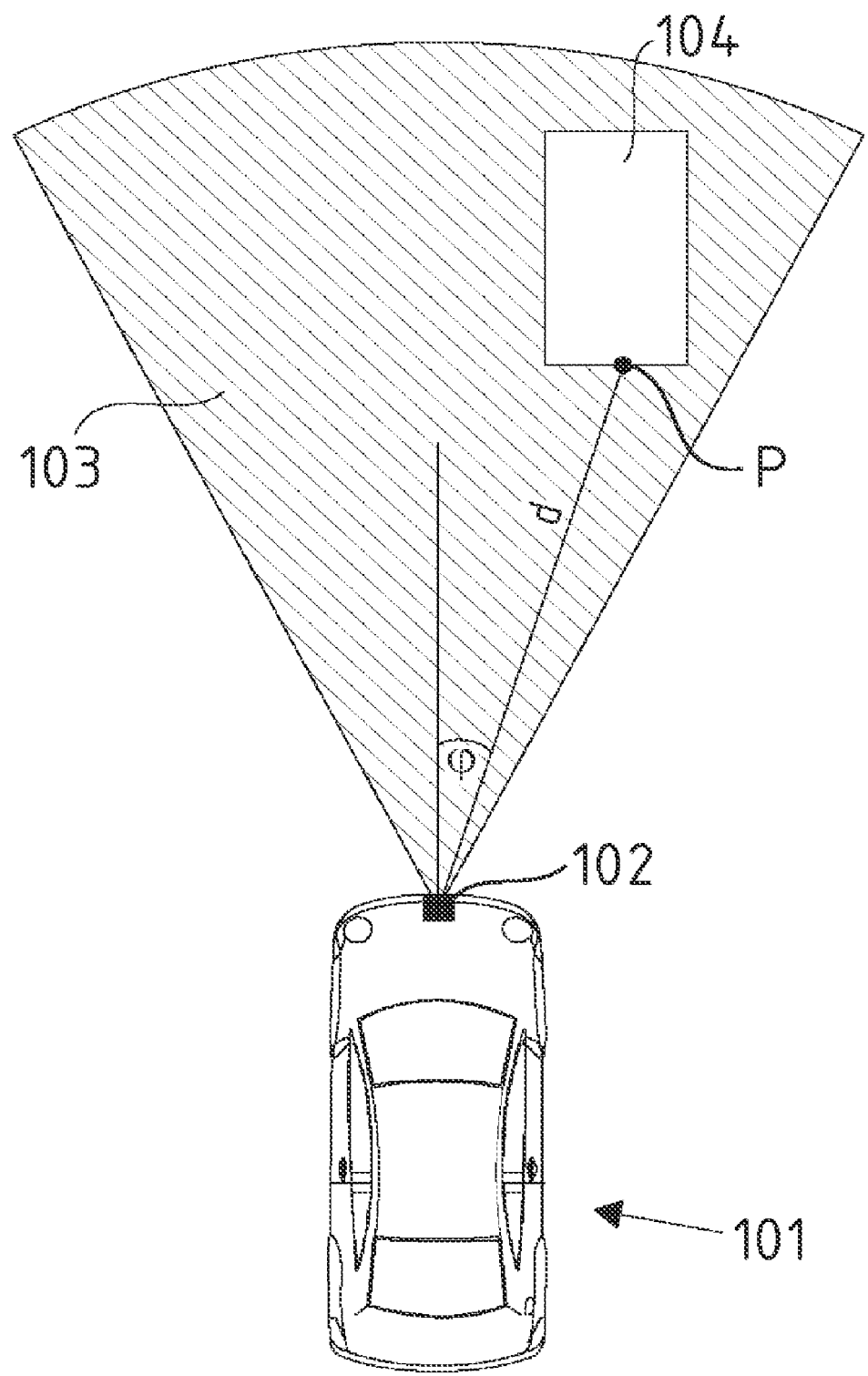
FIG. 1 shows a schematic of a motor vehicle having an ambient sensor.
Figure 2:
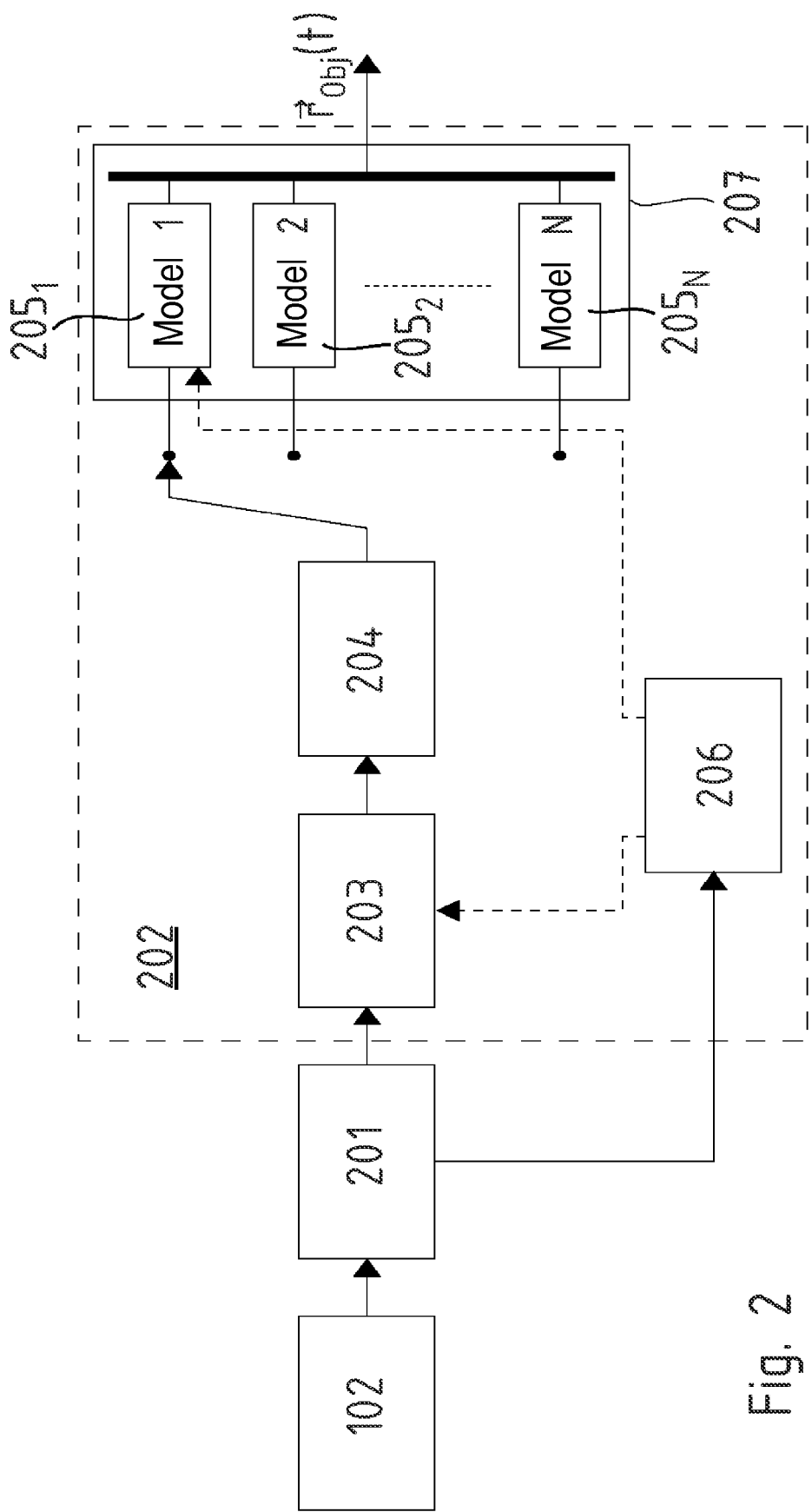
FIG. 2 shows a schematic block diagram of a device for predicting the trajectory of an ambient object.

Illustrated in FIG. 1 by way of example is a two-axle, four-wheel motor vehicle 101 that has an ambient sensor 102, with the aid of which it is possible to detect in the surroundings of the vehicle 101 ambient objects that are, in particular, further motor vehicles which are moving in the same driving lane or in an adjacent one. Shown by way of example is an ambient sensor 102 with a coverage 103 that comprises a solid angle ahead of the vehicle 101 in which, for example, an ambient object 104 is illustrated. The ambient sensor 102 is preferably a LIDAR (Light Detection and Ranging) sensor that is known per se to the person skilled in the art; equally, however, it is also possible to use other ambient sensors 102. The ambient sensor 102 measures the separations d from the detected points of an ambient object 104, and the angle φ between the connecting straight lines to these points and the central longitudinal axis of the vehicle 101, as is illustrated in FIG. 1 by way of example for a point P of the ambient object 104. The fronts of the detected ambient objects 104, which face the vehicle 101, are composed of a number of detected points, an object detection unit 201 that is shown in FIG. 2 and to which the sensor signals are transmitted producing the correlations between points and the shape of an ambient object 104, and determining a reference point for the ambient object 104. By way of example, it is possible in this case for the reference point to be selected as the midpoint of the ambient object 104 or the midpoint of the detected points of the ambient object 104. The speeds of the detected points, and thus the speed of the detected ambient objects 104, cannot be directly measured by means of the ambient sensor 102. They are calculated from the difference between the separations, measured in successive scanning steps, in the object detection unit 201. The duration of a scanning step is understood the duration of a time step in which a single scan of the coverage 103 is performed by means of the ambient sensor 102 and evaluation of the sensor data. In a way similar to the speed, it is also possible in principle to determine the acceleration of the ambient objects 104 by two-fold derivation of their position. However, the measured separations of the detected points and the measured angles have measuring errors that have such large effects on the acceleration thus determined that it is impossible to obtain sufficiently reliable information from the calculated acceleration, and the acceleration signal is not used. Moreover, a movement direction of the ambient object 104 is determined with the aid of a variation in the determined position of the ambient object 104.

The movement information relating to the ambient object 104, which is detected with the aid of the ambient sensor 102, relate initially to a reference system fixed on the vehicle. A conversion to an arbitrarily stationary reference system can be performed with the aid of the position, alignment and speed of the vehicle 101 in the stationary reference system. The position and alignment of the vehicle 101 inside a reference system initialized at an origin can, for example, be determined successively starting from the origin with the aid of the path length, which is covered from the start point and can be determined with the aid of signals from wheel speed sensors, and with the aid of the yaw angle of the vehicle 101, which can be determined on the basis of integrating the yaw rate of the vehicle 101 detected by means of a yaw rate sensor. It is equally possible to determine the position and alignment of the vehicle 101 in a stationary reference system, for example with the aid of a satellite-supported locating system.

The results of the evaluation of the sensor data of the ambient sensor 102 are fed to a prediction device 202 whose basic structure is likewise illustrated in FIG. 2 with the aid of a schematic block diagram. It includes a maneuver detection device 203, in which a vehicle maneuver executed by the ambient object 104 is identified. The maneuver detection device 203 is connected to the block 204, in which one of N models for predicting the trajectory of the reference point of the ambient object 104 is selected as a function of the identified driving maneuver. In accordance with the selected model, the block 204 activates one of the blocks 205$_1$, ..., 205$_N$ of the prediction device 207 in which the selected model is used to calculate the predicted path $\vec{r}_{Obj}(t)$ of the reference point of the ambient object 104, which is also denoted below as path or trajectory of the ambient object 104. The predicted positions of the ambient object 104 are compared in the block 206 with the measured positions of the ambient object 104. If the deviations are very large, it is assumed that the driving maneuver has not been correctly identified. In this case, a signal that leads to resetting of the stored data is sent to the maneuver detection device 203. The maneuver detection device therefore goes over into the state that, for example, is also present at the system start, and the identification of the current maneuver of the ambient object begins anew. In the event of small deviations between the predicted and the measured positions of the ambient object 104, parameters of the prediction model are adapted in order to improve the prediction. The object detection unit 201 and the prediction unit 202, or components 203-207 thereof are preferably software components of a computer program that is executed in a microprocessor unit of the vehicle 101.

Figure 3:
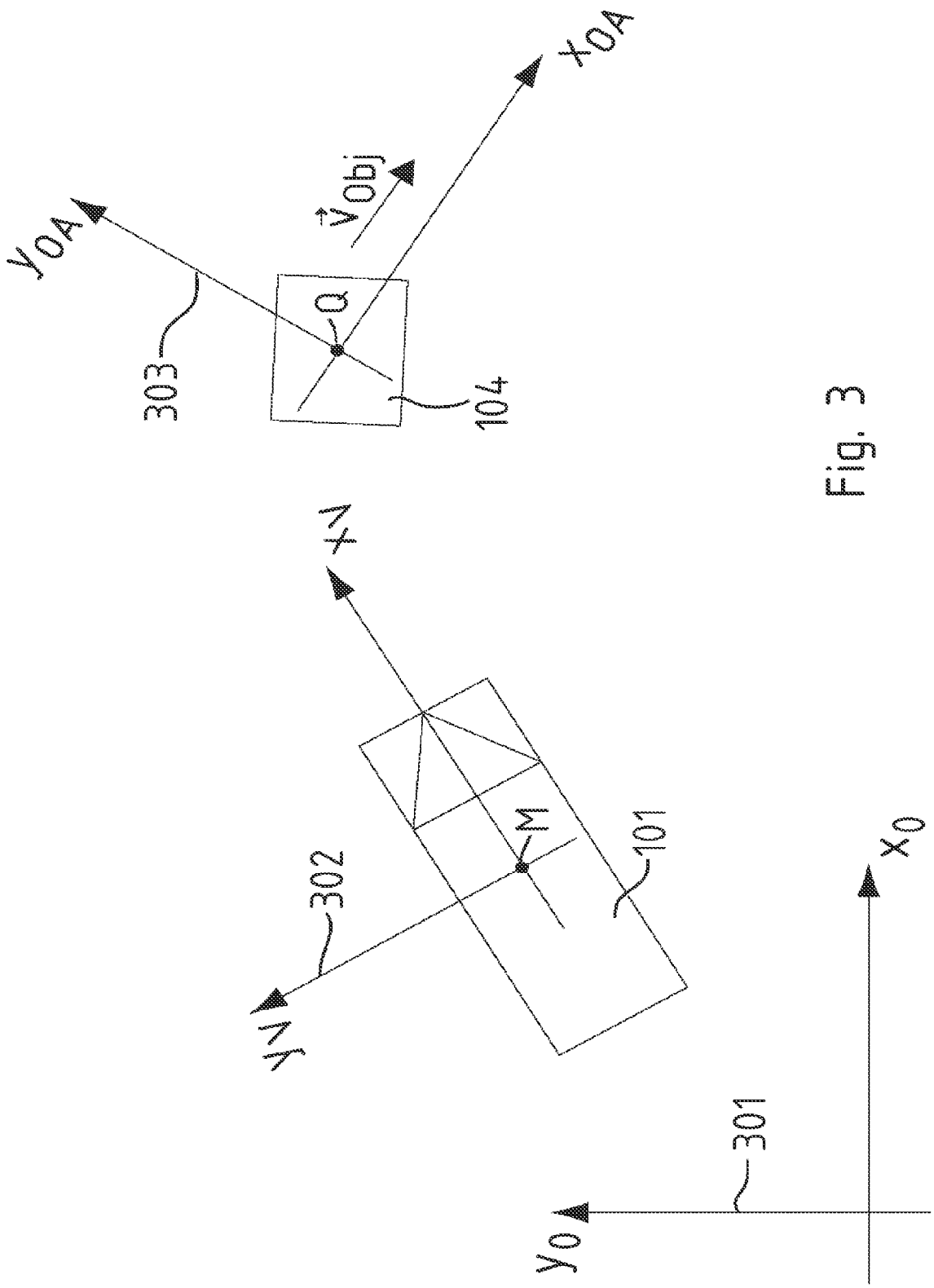
FIG. 3 shows an illustration of coordinate systems used for predicting.
Figure 4:
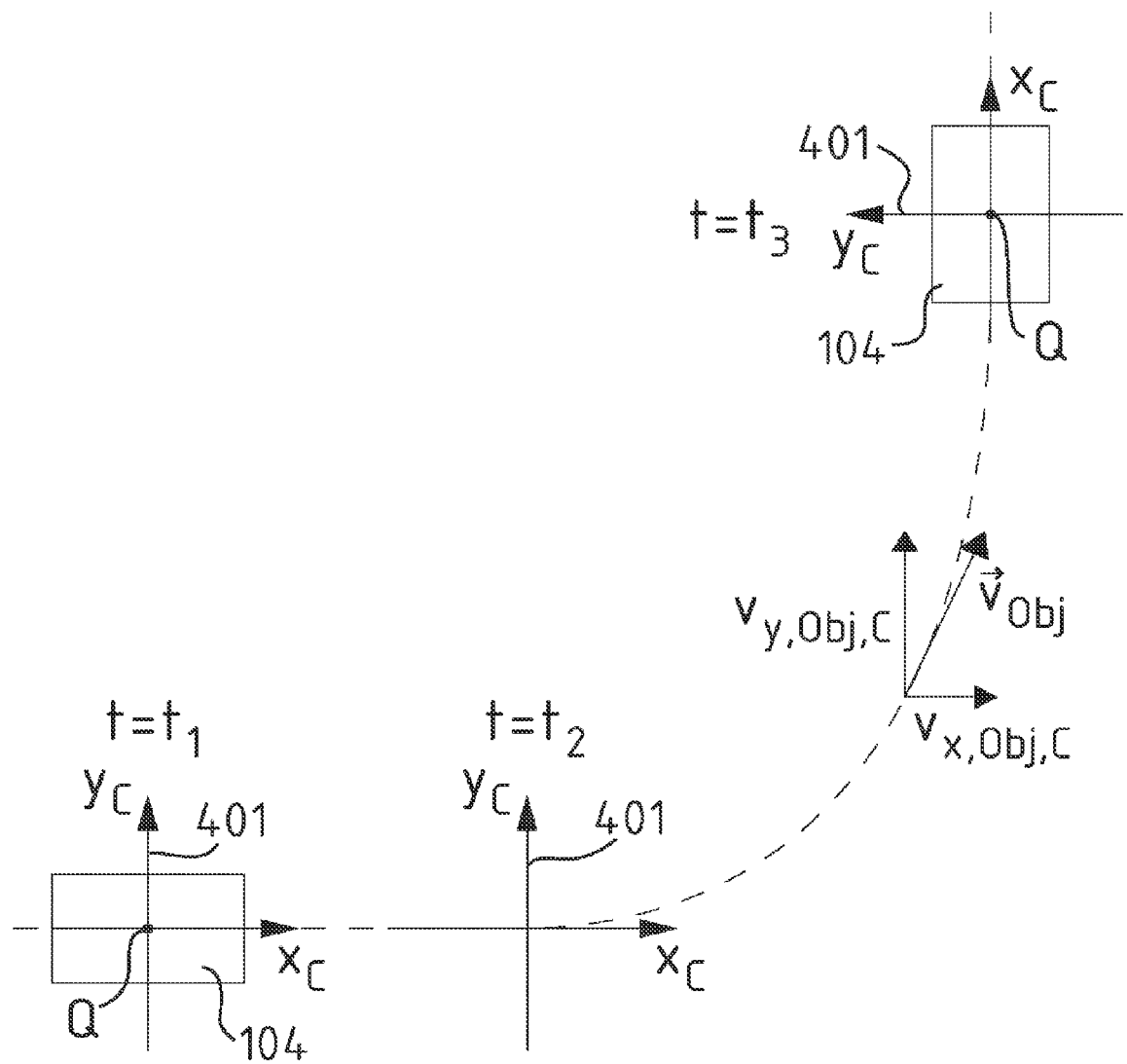
FIG. 4 shows an illustration of a characteristic coordinate system.

Illustrated in FIGS. 3 and 4 are the coordinate systems that are used, in particular, for identifying the driving maneuver and for predicting the object trajectory:

A. Absolute coordinate system: the absolute coordinate system 301 is a spatially fixed coordinate system. Variables referring to the absolute coordinate system 301 are denoted by the index "0".

B. Vehicle coordinate system: the vehicle coordinate system 302 is a stationary coordinate system whose origin is situated in each scanning step at the midpoint M of the vehicle 101. The positive x-axis points forward in the vehicle longitudinal direction, and the positive y-axis points to the left in the vehicle lateral direction. Variables referring to the vehicle coordinate system 302 are denoted by the index "V".

C. Object coordinate system: the object coordinate system 303 is a stationary coordinate system whose origin is located in each scanning step at the reference point Q of the ambient object 104. The positive x-axis points in the movement direction of the ambient object 104, that is to say in the direction of the speed $\vec{v}_{Obj}$ thereof, and the positive y-axis points to the left with regard to this direction. Variables referring to the object coordinate system 303 are denoted by the index "OA".

D. Characteristic coordinate system: in the event of a lane change maneuver or an instance of cornering, the object coordinate system 303 is fixed at the beginning of the driving maneuver inside the absolute coordinate system 301 for the duration of the driving maneuver. The fixed object coordinate system is denoted as characteristic coordinate system 401. Variables relating to the characteristic coordinate system 401 are denoted by the index "C".

The characteristic coordinate system 401 is illustrated in FIG. 4 at three different instants $t_1$, $t_2$ and $t_3$. The dashed line shows a path of the ambient object 104. At the instant $t_1$, the ambient object 104 is moving rectilinearly, and the characteristic coordinate system 401 corresponds to the object coordinate system 303, that is to say its origin is placed at the reference point Q of the ambient object 104 in each scanning step. It is determined at the instant $t_2$ that the ambient object 104 is beginning to traverse a curve. Consequently, the characteristic coordinate system 401 is fixed at an instant $t_2$ until it is determined at the instant $t_3$ that the ambient object 104 is again moving rectilinearly. Furthermore, FIG. 4 illustrates the decomposition of the object speed $\vec{v}_{Obj}$ into the components $V_{x,Obj,c}$ and $V_{y,Obj,c}$ within the characteristic coordinate system 401.

The maneuver detection in the maneuver detection device is divided into a separate detection with regard to the longitudinal and lateral movement behavior of the ambient object 104. The information relating to the detected longitudinal movement behavior is used in order to forecast the speed of the ambient object 104, and the information relating to the detected lateral movement behavior is used for forecasting the course angle of the ambient object 104. Furthermore, there is the special case of a stationary ambient object 104 and a nonidentifiable behavior. The maneuver detection is based on the evaluation of the course angle $\gamma_{Obj,0}$ in the absolute coordinate system. It is possible by neglecting the attitude angle to calculate this course angle from the longitudinal speed $v_{x,Obj,0}$ and the lateral speed $v_{y,Obj,0}$ in the absolute coordinate system 301:

$$\gamma_{Obj,0} = \arctan \frac{v_{y,Obj,0}}{v_{x,Obj,0}} \qquad (2)$$

The longitudinal and lateral speeds of the ambient object 104 in the absolute coordinate system 301 can in this case be obtained from the signals of the ambient sensor 102 by considering the position, alignment and speed of the vehicle 101 within the absolute coordinate system 301.

With regard to the longitudinal movement behavior, only two modes of behavior are distinguished in the context of the maneuver detection as a consequence of the previously described inaccuracies of the acceleration signal: when it holds that $\Delta v_{Obj,0} < -7\ m/s^2$, an instance of emergency braking of the ambient object 104 is detected, $\Delta v_{Obj,0}$ being the difference between the absolute values $v_{Obj,0}(k)$ and $v_{Obj,0}(k-1)$ of the speed of the ambient object 104 in the absolute coordinate system 301 in the current scanning step k and in the preceding scanning step k−1:

$$\Delta v_{Obj,0} = v_{Obj,0}(k) - v_{Obj,0}(k-1)$$

Driving at constant speed is determined if no instance of emergency braking of the ambient object 104 is determined.

Three typical driving situations are distinguished with regard to the lateral movement behavior:

a) driving straight ahead b) cornering c) lane change.

To this end, the characteristic course angle γObj,Ch,0 of the ambient object 104 in the absolute coordinate system 301 is defined on the basis of the absolute course angle $\gamma_{Obj,0}$: if the difference between the absolute course angle $\gamma_{Obj,0}(k)$ in a scanning step k and the absolute course angle $\gamma_{Obj,0}(k-1)$ in the preceding scanning step k−1 remains below a threshold value $\sigma_1$ in absolute terms, the characteristic course angle in the time step k corresponds to the absolute course angle, that is to say it holds that $\gamma_{Obj,Ch,0}(k) = \gamma_{Obj,0}(k)$. However, if the difference in absolute terms is greater than the threshold value $\sigma_1$, the characteristic course angle does not change in the time step k, and it holds that: $\gamma_{Obj,Ch,0}(k) = \gamma_{Obj,Ch,0}(k-1)$. In sum mary, the definition of the characteristic course angle is therefore:

$$\gamma_{Obj,Ch,0}(k) = \begin{cases} \gamma_{Obj,0}(k), & \text{if } |\gamma_{Obj,0}(k) - \gamma_{Obj,0}(k-1)| \leq \sigma_1 \\ \gamma_{Obj,Ch,0}(k-1) & \text{otherwise} \end{cases} \qquad (3)$$

When the course angle does not vary within a prescribed limit, in particular when it holds that $$|\Delta\gamma(k)| \equiv |\gamma_{Obj,0}(k) - \gamma_{Obj,Ch,0}(k)| \leq \sigma_2 \qquad (4)$$

with a threshold value $\sigma_2$, an instance of driving straight ahead is determined. An instance of cornering or a lane change of the ambient object 104 is determined when it holds that:

$$|\Delta\gamma(k)| > \sigma_2 \qquad (5)$$

A distinction is made between an instance of cornering and a lane change by evaluating the variation in the longitudinal and lateral speeds of the ambient object 104 in the characteristic coordinate system 401. An instance of cornering is established when the characteristic longitudinal speed decreases and the characteristic lateral speed increases, that is to say when it holds that $$\Delta v_{x,Obj,C}(k) \equiv v_{x,Obj,C}(k) - v_{x,Obj,C}(k-1) < -\sigma_3 \text{ and} \qquad (6)$$

$$\Delta v_{y,Obj,C}(k) \equiv v_{y,Obj,C}(k) - v_{y,Obj,C}(k-1) > \sigma_4 \qquad (7)$$

with prescribed positive threshold values $\sigma_3$ and $\sigma_4$. The sign of $\Delta\gamma$ specifies in this case whether there is a left-hand or right-hand curve, a left-hand curve being determined for $\Delta\gamma(k) > 0$ and a right-hand curve for $\Delta\gamma(k) < 0$.

In the case of a lane change, the course angle of the ambient object 104 changes quickly, the rate of change depending on the speed of the ambient object 104 (it is immediately clear that the rate of change of the course angle during a lane change at 30 m/s is smaller than the rate of change during a lane change at a speed of 10 m/s). Consequently, the variable $$K_{LC}(k) \equiv \Delta\gamma(k) \cdot v_{Obj,0}(k) \qquad (8)$$

is evaluated in order to detect the lane change, $v_{Obj,0}(k)$ denoting the absolute value of the object speed in time step k. A lane change is detected in this case when $|K_{LC}|$ lies in a prescribed range; otherwise, an instance of cornering is determined. A lane change is preferably determined, in particular, when $\|K_{LC}\|$ lies between 0.9 m/s and 4 m/s ($\Delta\gamma$ being specified in radian measure). The direction in which the lane change is performed is determined, in turn, with the aid or the sign or $K_{LC}$ or $\Delta\gamma$.

The previously explained criteria are illustrated qualitatively once again by way of summary in the following table (0: approximately zero, +: positive value, −: negative value, ++: high value):

|  | $|K_{LC}|$ | $K_{LC}$ | $|\Delta\gamma|$ | $\Delta v_{x,Obj,C}$ | $\Delta v_{y,Obj,C}$ |
|---|---|---|---|---|---|
| Driving straight ahead | 0 |  | 0 | 0 |  |
| Lane change to the left | + | + |  |  |  |
| Lane change to the right | + | − |  |  |  |
| Curve to the left | ++ | + | + | − | + |
| Curve to the right | ++ | − | + | − | + |

After the detection of the driving maneuver in the maneuver detection device 203, the result is passed on to the block 204 in which a model is selected for calculating the trajectory as a function of the determined driving maneuver. The selected model is used to predict the positions of the ambient object 104 or its reference point. The position $(x_{Obj,0}, y_{Obj,0})$ is calculated for each prediction step $$k_n^P = k + \frac{n \cdot \Delta t_p}{T} \tag{9}$$

$n=1, \ldots, N$ being a positive number and $\Delta t_p$ being a prediction time interval. T denotes the duration of a scanning step. The prediction is performed recursively with the aid of the following relationships:

$$x_{Obj,0}(k_n^P) = x_{Obj,0}(k_{n-1}^P) + v_{x,Obj,0}(k_n^P) \cdot \Delta t_p \tag{10}$$

$$y_{Obj,0}(k_n^P) = y_{Obj,0}(k_{n-1}^P) + v_{y,Obj,0}(k_n^P) \cdot \Delta t_p \tag{11}$$

Starting from the position $(x_{Obj,0}(k), y_{Obj,0}(k))$ determined at the start of the detected maneuver in the time step $k = k_0^P$ from the signals of the ambient sensor 102, the positions in the time steps $k_1^P$ to $k_N^P$ are successively calculated with the aid of these equations, the time duration $N \cdot \Delta t_p$ being a few seconds. The longitudinal and lateral speeds of the ambient object 104 in the equations (10) and (11) are calculated in the following way:

$$v_{x,Obj,0}(k_n^P) = v_{Obj,0}(k_n^P) \cdot \cos(\gamma_{Obj,0}(k_n^P)) \tag{12}$$

$$v_{y,Obj,0}(k_n^P) = v_{Obj,0}(k_n^P) \cdot \sin(\gamma_{Obj,0}(k_n^P)) \tag{13}$$

The prediction of the object speed and of the course angle of the ambient object 104 is performed in a function of the detected driving maneuver, and is described below for the different driving maneuvers. Longitudinal and lateral movements are once again considered in this case separately from one another.

With regard to the longitudinal movement, a distinction is made between driving at constant speed and an instance of emergency braking of the ambient object 104. It holds that:

$$v_{Obj,0}(k_n^P) = v_{Obj,0}(k) \tag{14}$$

in the event of uniform movement at constant speed.

It is assumed in the case of an instance of emergency braking of the ambient object 104 that the speed of the ambient object 104 decreases with a prescribed acceleration $a_{Obj,Ref}(k) < 0$ until the ambient object 104 has reached a standstill. It therefore holds here that:

$$v_{Obj,0}(k_n^P) = \begin{cases} v_{Obj,0}(k) + a_{Obj,Ref}(k) \cdot n \cdot \Delta t_p, & \text{if } n \cdot \Delta t_p \le -\frac{v_{Obj,0}(k)}{a_{Obj,Ref}(k)} \\ 0 & \text{otherwise} \end{cases} \tag{15}$$

According to this calculation, the stopping path in the case of the instance of the emergency braking maneuver of the ambient object 104 is $$S_{brake} = -\frac{v_{Obj,0}^2(k)}{2 \cdot a_{Obj,Ref}(k)}$$

An instance of driving straight ahead, an instance of cornering and a lane change are distinguished with regard to the lateral movement of the ambient object 104. The course angle does not change in the event of an instance of driving straight ahead, that is to say it holds that:

$$\gamma_{Obj,0}(k_n^P) = \gamma_{Obj,0}(k) \tag{16}$$

When an ambient object 104 is transversing a curve, it passes quickly out of the coverage of the ambient sensor 102. Consequently, it is not necessary to determine the parameters of the curve such as, for example, radius and angle portion. The following simple formulation:

$$\gamma_{Obj,0}(k_n^P) = \gamma_{Obj,0}(k) + p \cdot n \cdot \Delta t_p \tag{17}$$

is therefore used for the prediction.

The parameter p has in this case an arbitrarily selected initial value that can be adapted by means of the correction algorithm still to be described.

It is assumed in the case of a lane change that the trajectory of the ambient object 104 inside the characteristic coordinate system 401 is described by a sigmoid function of form $$y_{Obj,C}(x_{Obj,C}) = \frac{1}{b/d + c \cdot \exp(-d \cdot x_{Obj,C})} \tag{18}$$

With $b = d/B$ and $c = 1/B \cdot \exp(d \cdot C)$, this can also be written as:

$$y_{Obj,C}(x_{Obj,C}) = \frac{B}{1 + \exp(-d \cdot (x_{Obj,C} - C))} \tag{19}$$

Figure 5:
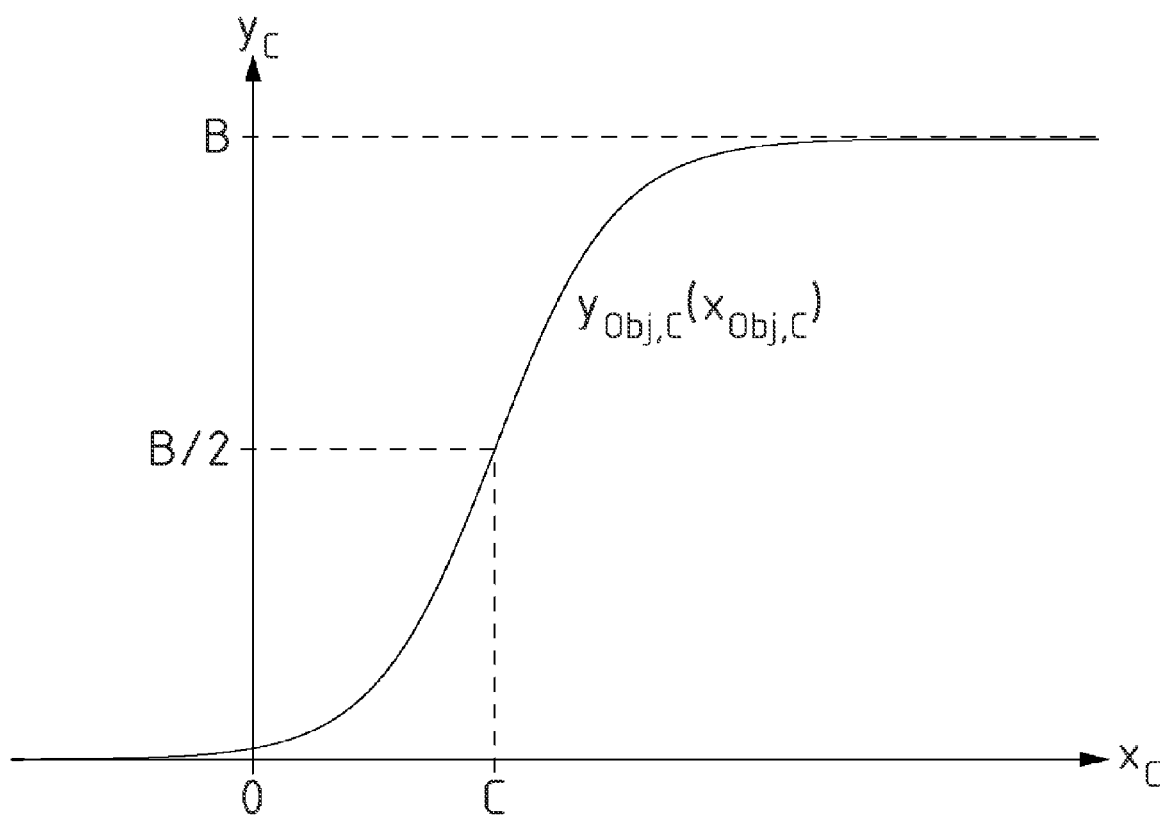
FIG. 5 shows an illustration of a sigmoid function in the characteristic coordinate system.

The function that is illustrated schematically in FIG. 5 has a point of inflection at $x_c = C$. The function value at the point of inflection is B/2. Furthermore, the curve is point symmetric about the point of inflection (c, B/2), and it holds that:

$$y_{Obj,C}(x_{Obj,C}) \to 0 \text{ for } x_{Obj,C} \to -\infty$$

and $$y_{Obj,C}(x_{Obj,C}) \to B \text{ for } x_{Obj,C} \to +\infty$$

B is thus the lateral offset of the ambient object 104 during the maneuver, which is also denoted here as maneuver width and corresponds to the lane width $D_{Lane}$ of a driving lane in the event of a lane change. It therefore follows that $$\lim_{x_{Obj,C} \to \infty} y_{Obj,C}(x_{Obj,C}) - \lim_{x_{Obj,C} \to -\infty} y_{Obj,C}(x_{Obj,C}) \stackrel{!}{=} D_{Lane}, \tag{20}$$

so that the following holds for the parameter $B_{left}$ of the sigmoid:

$$B_{left} = \frac{d_{left}}{b_{left}} = D_{Lane} \tag{21}$$

in the event of a lane change to the left, that is to say in the direction of the positive y-axis. Furthermore, the starting point is a duration $T_{change}$ and a start instant $t_{detect}$ for the lane change, there being prescribed for the duration $T_{Change}$ a typical value that can, however, likewise be adapted by means of the correction algorithm still to be described. Since the entire lateral offset is achieved only in an infinite duration of the maneuver and the sigmoid does not run exactly through the origin of the characteristic coordinate system 401, a small lateral tolerance $y_{Tol}$ is introduced, and so it holds that:

$$y_{Obj,C}(x_{Obj,C}(t_{detect})) = y_{Tol} \tag{22}$$

$$y_{Obj,C}(x_{Obj,C}(t_{detect} - T_{Change})) = D_{Lane} - y_{Tol} \tag{23}$$

$x_{Obj,C}(t_{detect})=0$ because of the construction of the characteristic coordinate system 401. It therefore follows from using equation (19) that:

$$c_{left} = \frac{1}{y_{Tol}} - \frac{1}{D_{Lane}} \quad (24)$$

Furthermore, considering that the absolute values of the object speed in the absolute coordinate system 301 and in the characteristic coordinate system 401 are equal, and neglecting the speed of the ambient object 104 in the $y_C$-direction, it holds that:

$$x_{Obj,C}(t_{detect} + T_{Change}) = x_{Obj,C}(t_{detect}) + v_{Obj,0}(t_{detect}) \cdot T_{Change} \quad (25)$$
$$= v_{Obj,0}(t_{detect}) \cdot T_{Change}$$

By using equation (20), this yields $$d_{left} = \frac{1}{T_{Change} \cdot v_{Obj,0}(t_{detect})} \ln\left(\frac{1}{c_{left}}\left[\frac{1}{D_{Lane}-y_{Tol}} - \frac{1}{D_{Lane}}\right]\right) \quad (26)$$

for the parameter d of the sigmoid function.

The sigmoid function, which describes a lane change to the left, is completely determined inside the characteristic coordinate system with the aid of equations (18), (21) and (22):

$$y_{Obj,C}(x_{Obj,C}) = \frac{1}{b_{left}/d_{left} + c_{left} \cdot \exp(-d_{left} \cdot x_{Obj,C})} \quad (27)$$

It holds correspondingly for a lane change to the right, that is to say in the direction of the negative $Y_C$-axis, that:

$$y_{Obj,C}(x_{Obj,C}) = \frac{1}{b_{right}/d_{right} + c_{right} \cdot \exp(-d_{right} \cdot x_{Obj,C})} \quad (28)$$

The parameters are given here by:

$$b_{right} = -b_{left}$$

$$c_{right} = -c_{left}$$

$$d_{right} = d_{left}.$$

The course angle of the ambient object 104 in the characteristic coordinate system 401 is given by:

$$\gamma_{Obj,C}(x_{Obj,C}) = \arctan\left(\frac{dy_{Obj,C}}{dx_{Obj,C}}\right) = \arctan\left(\frac{c \cdot d \cdot \exp(-d \cdot x_{Obj,C})}{[b/d + c \cdot \exp(-d \cdot x_{Obj,C})]^2}\right) \quad (29)$$

The course angle to be calculated in the time step $k_N^P$ in the absolute coordinate system is given by:

$$\gamma_{Obj,0}(k_n^P) = \gamma_{Obj,0}(k) + \gamma_{Obj,C}(x_{Obj,C}(k_n^P)). \quad (30)$$

Here, as well, $x_{Obj,C}(k_N^P) = v_{Obj,0}(k) \cdot n \cdot \Delta t_p$ can be set approximately by neglecting the lateral speed of the ambient object 104 in the characteristic coordinate system 401, and so it holds that:

$$\gamma_{Obj,0}(k_n^P) = \gamma_{Obj,0}(k) + \gamma_{Obj,C}(v_{Obj,C}(k) \cdot n \cdot \Delta t_p) \quad (31)$$

Figure 6:
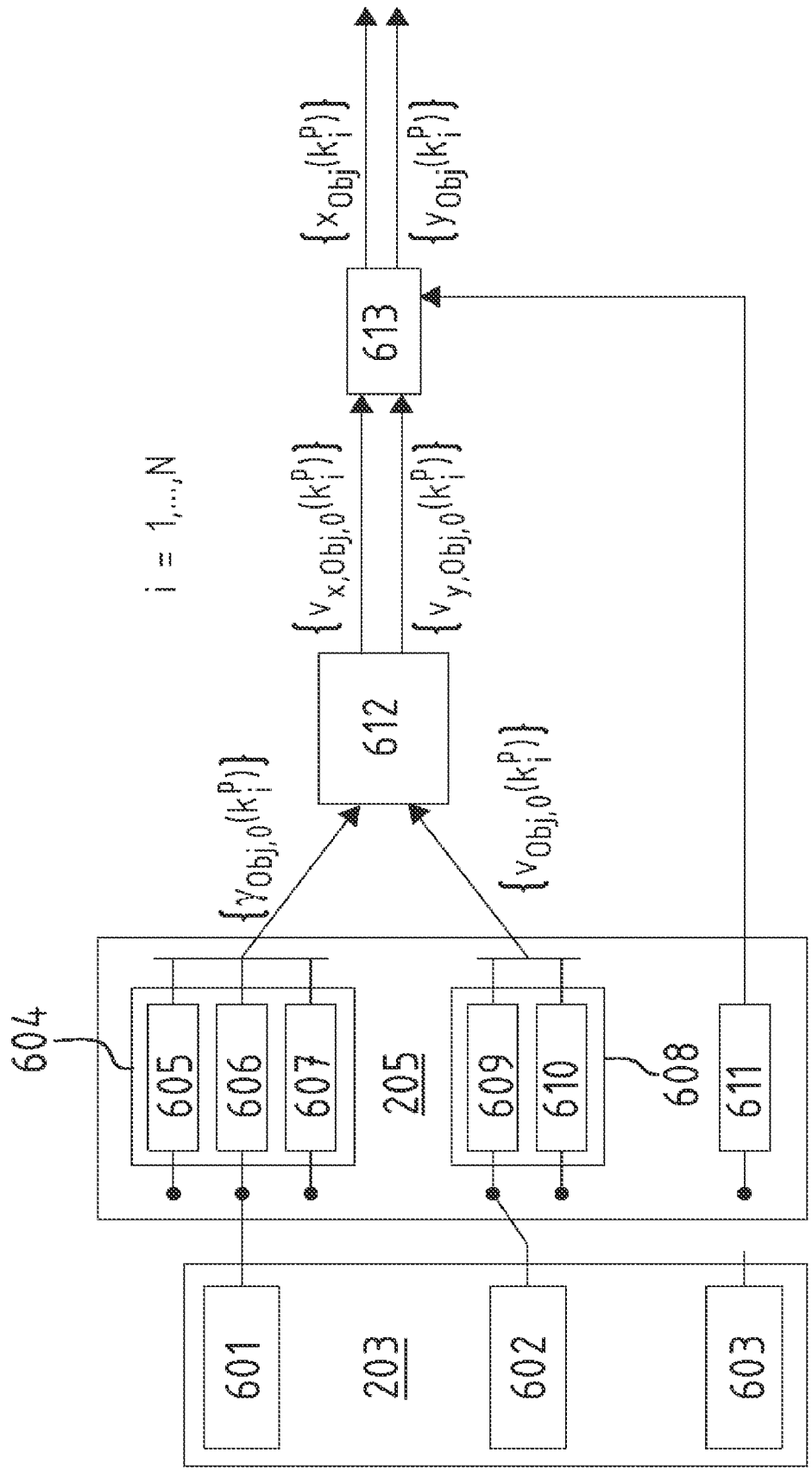
FIG. 6 shows a schematic block diagram of a section of the apparatus for predicting the trajectory of an ambient object.

The prediction algorithm will now be described in summary with the aid of FIG. 6. The driving maneuver executed by the ambient object 104 is identified in the maneuver detection device 203 with regard to the longitudinal and lateral dynamics of the ambient object 104. In this process, with regard to the lateral dynamics, which is analyzed in the block 601, a distinction is made between an instance of driving straight ahead, a lane change and an instance of cornering, and a distinction is made between a movement at constant speed and an emergency braking maneuver with regard to the longitudinal dynamics, which is examined in the block 602. Furthermore, it is also determined if appropriate that the ambient object 104 is not moving (block 603). The movement of the ambient object 104 is then predicted in the prediction device 205 as a function of the identified maneuver. With regard to the lateral dynamics, this is performed in the block 604, in which the course angles of the ambient object 104 are calculated for the prediction steps $k_1^P, \ldots, k_N^P$. Provided in particular to this end are the blocks 605, 606 and 607 in which the course angles are determined with the aid of a model in accordance with the identified lateral dynamics maneuver. If an instance of driving straight ahead has been identified, the calculation is performed in this case in the block 605, while in the case of a lane change it is carried out in the block 606, and in the block 607 in the case of a curve. With regard to the longitudinal dynamics, the prediction of the object movement is performed in the block 608, likewise with the aid of a model that is selected in accordance with the identified longitudinal dynamics maneuver. In particular, in this case the speeds of the ambient object 104 are calculated in the prediction steps $k_1^P, \ldots, k_N^P$, this being performed in the block 609 in the case of a movement at constant speed, and in the block 610 in the case of an instance of emergency braking. If it has been determined that the ambient object 104 is not moving, the prediction of the "movement" is performed in the block 611.

The course angles $\{\gamma_{Obj,0}(k_i^P)\}$, i=1, ..., N, which are calculated in the block 604, as well as the speeds $\{v_{Obj,0}(k_i^P)\}$, i=1, ..., N, calculated inside the block 608, are handed on to the block 612. In this block, the longitudinal and lateral speeds $\{v_{Obj,0}(k_i^P)\}$ and $\{v_{Obj,0}(k_i^P)\}$, i=1, ..., N of the ambient object 104 are determined with the aid of equations (12) and (13). The positions $(x_{Obj,0}(k_1^P), y_{Obj,0}(k_1^P))$ to $(x_{Obj,0}(k_N^P), y_{Obj,0}(k_N^P))$ of the ambient object 104 in the prediction steps $(k_1^P), \ldots, (k_N^P)$ are then determined successively in the block 613 with the aid of equations (10) and (11), and the trajectory of the ambient object 104 is thereby determined. It holds here in the case of a stationary ambient object 104 that $$x_{Obj,0}(k_1^P) = \ldots = x_{Obj,0}(k_N^P) = x_{Obj,0}(k) \quad (28)$$

$$y_{Obj,0}(k_1^P) = \ldots = y_{Obj,0}(k_N^P) = y_{Obj,0}(k) \quad (29)$$

It is possible to predict the object trajectory with the aid of the procedure represented above. However, it has emerged that the results, which in particular exhibit inaccuracies because of the measuring errors of the ambient sensor 102, can be improved by adapting the prediction in each scanning step k with the aid of the detected information relating to the ambient object 104. The adaptation is preferably performed according to the principle of error diagnosis and error elimination. The predicted position of the previous prediction step is firstly compared with the measured position in the current scanning step. If a substantial deviation is determined in the process, the driving maneuver of the ambient object 104 is not correctly identified, or the identified maneuver has been ended. In this case, a reset is made and the identification of the current driving maneuver of the ambient object 104 begins a new independently of the previously stored data relating to the maneuver. Until the correct maneuver has been identified, the path of the ambient object 104 is predicted with the aid of the Euler extrapolation. If the deviation between the predicted and the measured positions is only slight, the prediction is adapted. In particular, in the event of an instance of cornering of the ambient object 104 the curve parameter p in equation (17) is adapted here. In the event of a lane change of the maneuver, the parameters $D_{Lane}$ and $T_{Change}$ of the sigmoid function are adapted.

Figure 7:
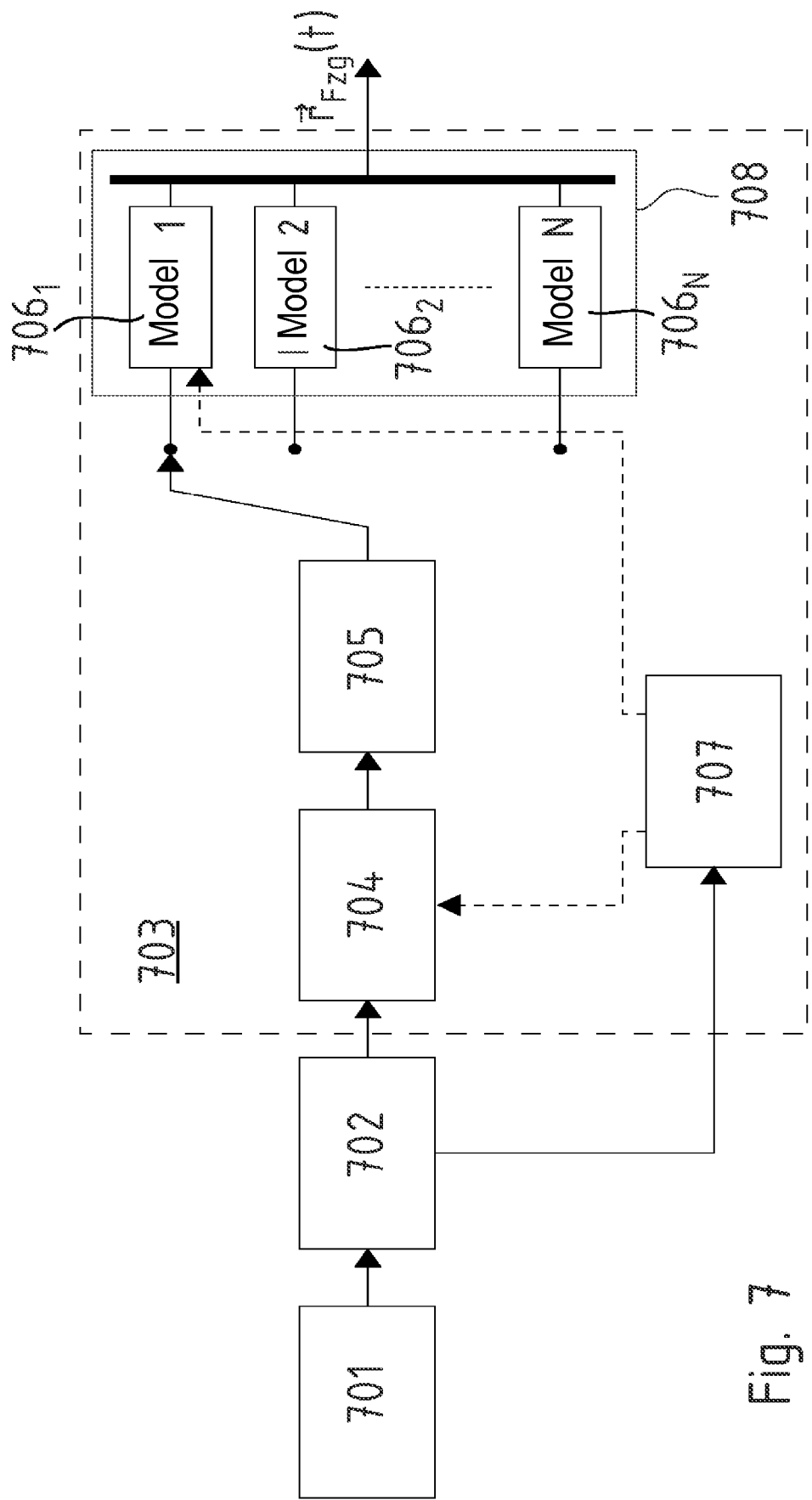
FIG. 7 shows a schematic block diagram of a device for predicting the trajectory of the vehicle.

According to the previously described principle of the model-based prediction, the movement trajectory of the vehicle 101 itself is also determined. A device for carrying out the prediction is illustrated in FIG. 7 schematically with the aid of a block diagram. The movement state of the motor vehicle 101 is determined with the aid of the vehicle sensor system 701 which, for example, comprises wheel speed sensors, a longitudinal and lateral acceleration sensor, a yaw rate sensor and a steering angle sensor. The sensor signals are evaluated in the block 702. Furthermore, movement variables that are not accessible to direct measurement can be estimated in the block 702 from the sensor signals. The determined movement variables of the vehicle 101 are fed to a prediction unit 703 whose basic structure is likewise illustrated in FIG. 7. It includes a driving maneuver detection device 704 in which driving maneuvers of the vehicle 101 are identified with the aid of the movement variables. The driving maneuver detection device 704 is connected for signaling purposes to the block 705, in which one of N models is selected for predicting the trajectory of the vehicle 101 as a function of the identified driving maneuver. In accordance with the selected vehicle model, the block 705 activates one of the blocks 706₁, . . . , 706ₙ of the prediction device 708, in which the predicted path $\vec{r}F_{zg}(t)$ of the reference point of the vehicle 101 is then calculated, which path is also denoted below as path or trajectory of the vehicle 101. The predicted positions of the vehicle 101 are compared in the block 707 with the positions of the vehicle 101 determined with the aid of the vehicle sensor system 701. If the deviations are very large, it is to be assumed that the driving maneuver has not been correctly identified. In this case, a signal that leads to a reset is sent to the driving maneuver detection device 704. After the reset, a renewed identification of the current driving maneuver is performed without accessing the data previously stored in relation to the maneuver. In the event of small deviations between the predicted and the measured position, parameters of the prediction model used are adapted in order to improve the prediction. The components 702-708 of the system are likewise designed as software components of a computer program that is executed in a microprocessor unit of the vehicle 101.

As with the prediction of the object trajectory, longitudinal and lateral dynamics of the vehicle 101 are considered separately from one another with regard to the maneuver identification. For example, with reference to the longitudinal dynamics a distinction is made between an acceleration maneuver, a uniform movement and a braking maneuver with the aid of the signals of the wheel speed sensors, the signals of a longitudinal acceleration sensor and/or with the aid of information relating to the actuating state of the gas pedal and of the vehicle brake. Instances of driving straight ahead, cornering and lane change are distinguished with reference to the lateral dynamics.

An instance of driving straight ahead is detected whenever the yaw rate $\dot{\psi}$ or the steering angle $\delta_H$ does not overshoot prescribed threshold values $k_{d\psi/dt}$ and $k_{\delta_H}$, respectively, in absolute terms, that is to say when it holds that:

$$|\dot{\psi}| \leq k_{d\psi/dt} \text{ or } |\delta_H| \leq k_{\delta_H} \tag{30}$$

It has been determined with regard to an instance of cornering and a lane change that an evaluation of the product of the steering angle at the steerable wheels of the vehicle 101 and the yaw rate of the vehicle 101 permits a distinction between these driving maneuvers as early as during their initial phase. It has been shown in this case that an instance of cornering can be determined when it holds that $$\delta_H \cdot \dot{\psi} \geq k_{\delta_H \psi} \text{ or } |\psi - \psi_{Start}| \geq k_\psi \tag{31}$$

Figure 8:
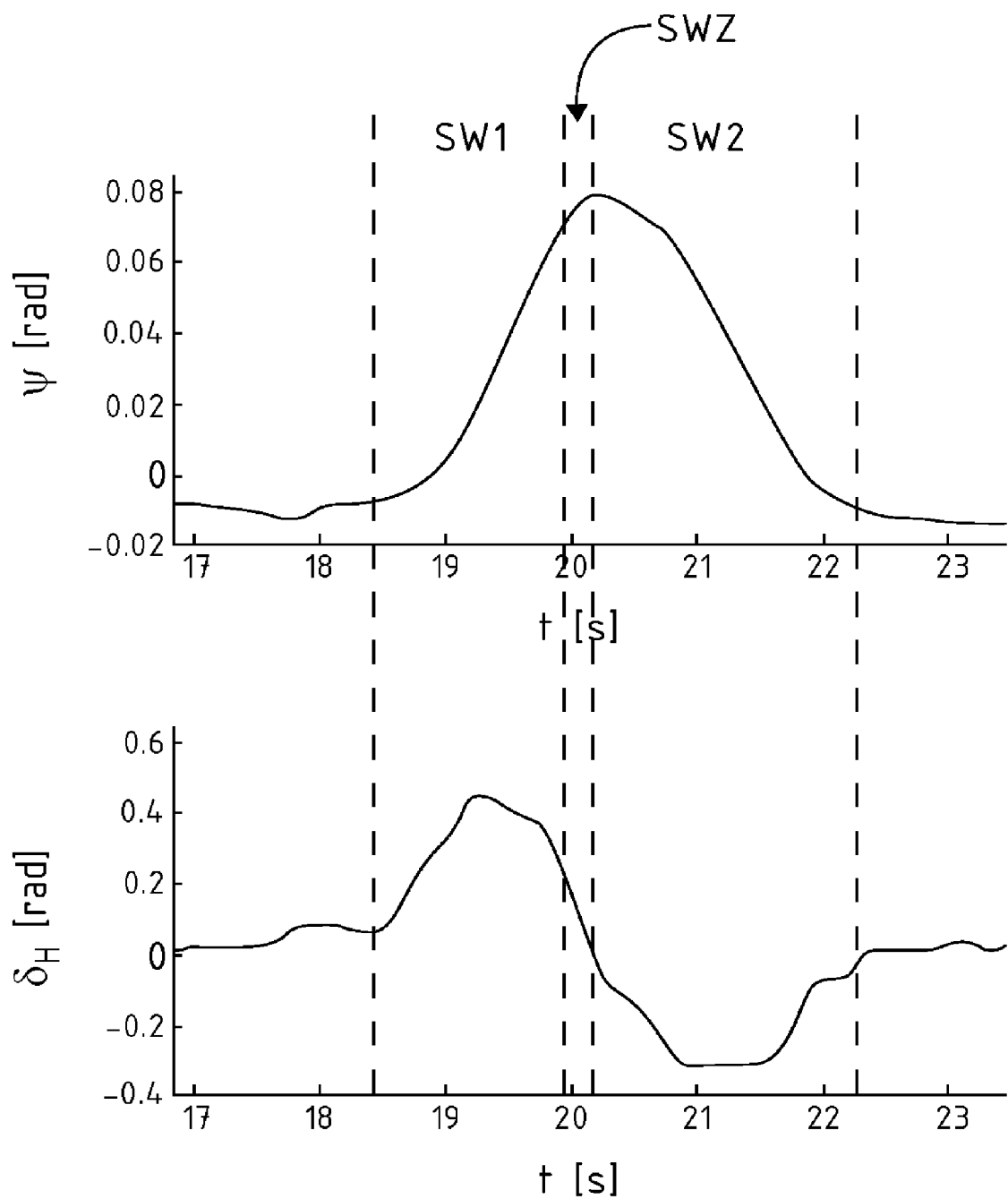
FIG. 8 shows diagrams that illustrate by way of example the time profiles of the yaw angle of the vehicle and of a steering angle during a lane change, and a subdivision of the lane change into various phases.

$k_{\delta_H \psi}$ and $k_\psi$ being prescribed threshold values, and $\psi_{Start}$ denoting the yaw angle, stored in a memory, of the vehicle 101 at the beginning of the driving maneuver when the maneuver has been detected with the aid of the first condition in (31). A lane change is detected when neither an instance of driving straight ahead nor an instance of cornering has been determined. In order to improve the robustness of the detection, lane changes are additionally subdivided into three phases. In phase 1 (SW1), the vehicle 101 is steered in the direction of the desired lane, starting from the instantaneous lane. During an intermediate phase (SWZ), the vehicle 101 moves in a substantially rectilinear fashion. The intermediate phase is generally substantially shorter than the remaining phases and merges into phase 2 (SW2) of the lane change. In phase 2, the vehicle 101 is again turned parallel to the initial direction before the beginning of the lane change. The yaw angle of the vehicle 101 increases in absolute terms in phase 1, remains substantially constant in the intermediate phase and returns to the original value again in phase 2. The time profiles of the yaw angle $\psi$ and of the steering angle $\delta_H$, as well as the assignment to the phases of the lane change are illustrated in FIG. 8 for a lane change examined by way of example.

Phase 1 of the lane change is detected when neither an instance of driving straight ahead nor an instance of cornering has been detected with the aid of the conditions (30) and (31). After the detection of the lane change, the rate of change of the yaw angle, that is to say the yaw rate of the vehicle 101, and of the steering angles are monitored. If the yaw rate and the steering angle drop below prescribed threshold values, a transition into the intermediate phase is detected. After a change in sign of the yaw rate, and after yaw rate and steering angle have once again overshot the threshold values in absolute terms, a transition from the intermediate phase into phase 2 is determined. Since it is often not possible at the beginning of the maneuver to make a clear distinction between an instance of cornering and a lane change, truncation conditions are initially provided with regard to the duration of the individual phases of the lane change. If these truncation conditions are fulfilled, an instance of cornering or an instance of driving straight ahead is detected instead of the lane change. A first truncation condition is fulfilled in this case when the duration of phase 1 is smaller than a threshold value $T_{SW1,min}$:

$$t - t_{SW1,Start} < T_{SW1,min} \tag{32}$$

In this case, $t_{SW1,Start}$ is the instant at which the beginning of lane change has been detected, and the variable $t - t_{SW1,Start}$ corresponds to the time duration of phase 1 of the lane change at the observation instant t. The second truncation condition is fulfilled when the duration of phase 1 of the lane change is greater than a threshold value $T_{SW1,max}$:

$$t - t_{SW1,Start} > T_{SW1,max} \tag{33}$$

A third truncation condition is fulfilled when the duration of the intermediate phase of the lane change is greater than a threshold value $T_{swz,max}$:

$$t - t_{SWZ,Start} > T_{SWZ,max} \tag{34}$$

In this case, $t_{SWZ,Start}$ is the instant at which the beginning of the intermediate phase of the lane change has been detected, and the variable $t-t_{SWZ,Start}$ corresponds to the time duration of the intermediate phase of the lane change at the observation instant t.

Figure 9:
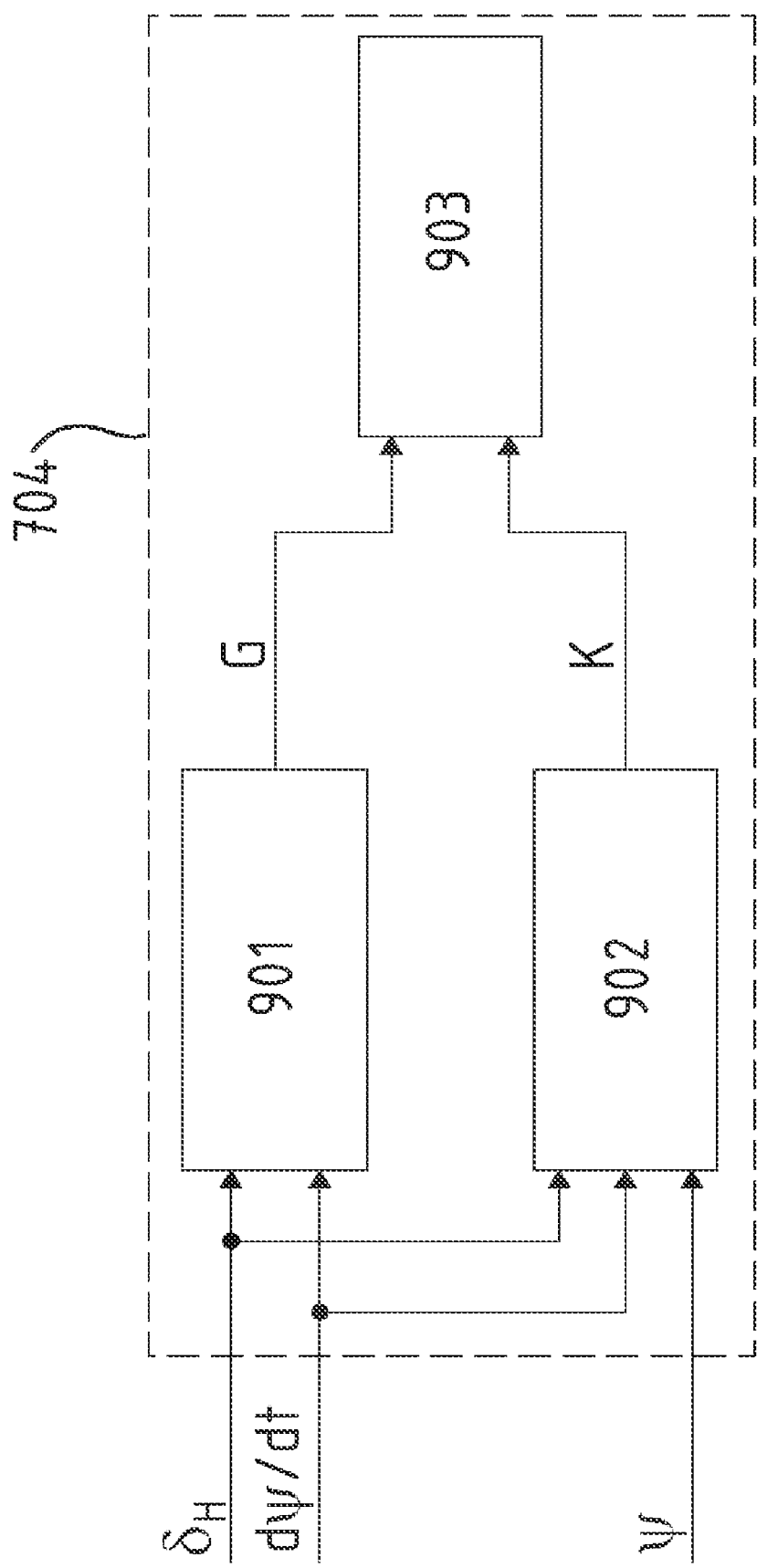
FIG. 9 shows a schematic block diagram of a section of a device for identifying a driving maneuver of the vehicle.
Figure 10:
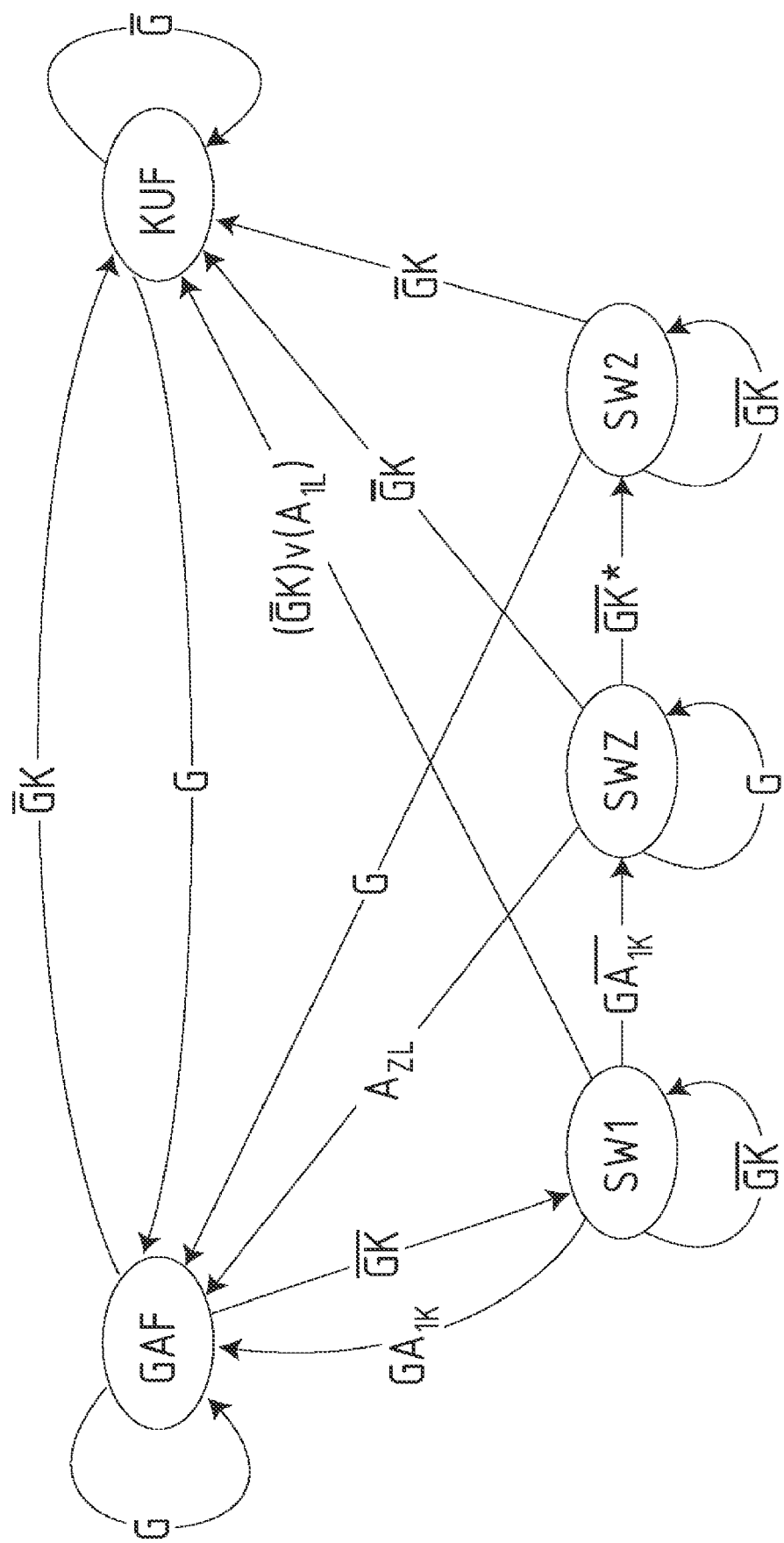
FIG. 10 shows a state diagram for illustrating the identification of a driving maneuver of the vehicle.

As illustrated in FIG. 9 with the aid of a schematic block diagram of the driving maneuver detection device 704, in order to identify the driving maneuver of the vehicle 101 it is determined in the block 901 or the block 902 whether the conditions for an instance of driving straight ahead (G) or an instance of cornering (K) are fulfilled. The driving maneuver is determined in the block 903 by calling upon these results and calling upon the truncation conditions. This is performed with the aid of a state diagram, which is illustrated in FIG. 10. The transition conditions between the detection of an instance of driving straight ahead (GAF), an instance of cornering (KUF) and the three phases of a lane change (SW1, SWZ, SW2) are illustrated in the diagram. The transition conditions are denoted in the figure in the following way:

G: an instance of driving straight ahead was detected in block 901.
$\overline{G}$: no instance of driving straight ahead was detected in block 901.
K: an instance of cornering was detected in block 902.
$\overline{K}$: no instance of cornering was detected in block 902.
$A_{1K}$: the truncation condition (32) is fulfilled.
$\overline{A}_{1K}$: the truncation condition (32) is not fulfilled.
$A_{1L}$: the truncation condition (33) is fulfilled.
$A_{ZL}$: the truncation condition (34) is fulfilled.

If it is not specified by a v symbol in the figure, individual conditions for a state transition need to be fulfilled cumulatively. The star at the transition from the intermediate phase to phase 2 of the lane change signifies that the sign of the yaw rate must be opposite to the sign of the yaw rate in the case of the transition from an instance of driving straight ahead in phase 1 of the lane change.

By contrast with the prediction of the object trajectory, in the case of predicting the trajectory of the vehicle 101 the x- and y-coordinates of the reference point M of the vehicle 101 are calculated directly. The prediction is performed firstly with reference to the vehicle coordinate system 302. The prediction is then transformed into the absolute coordinate system 301. If an instance of driving straight ahead by the vehicle 101 has been detected, a vanishing lateral speed of the vehicle 101 is assumed, and so it holds that $$y_v(t+T_p)=0 \tag{35}$$

$T_p$ denoting the prediction period, which amounts, in turn, to a few seconds. It holds for the x-coordinate of the reference point M of the vehicle 101 that:

$$x_V(t+T_p) = v_{x,V}(t) \cdot T_p + \frac{1}{2} \cdot a_{x,V}(t) \cdot T_p^2 \tag{36}$$

The longitudinal acceleration $a_x$ of the vehicle 101, which is, for example, measured with the aid of a longitudinal acceleration sensor or determined from the signals of the wheel speed sensors, is preferably subjected to weak low-pass filtering when an acceleration process or braking process has been detected. If this is not the case, the longitudinal acceleration signal is preferably subjected to strong low-pass filtering. As a result, the noise of the acceleration signal is suppressed for instances of travel at virtually constant speed, whereas in the event of speed changes the entire dynamics of the signal is considered. The longitudinal speed $v_{x,V}(t)$ of the vehicle 101 in the vehicle coordinate system 302 at the observation instant t corresponds to the longitudinal speed of the vehicle in the speed of the vehicle in the absolute coordinate system 301, since the vehicle coordinate system 302 is likewise a stationary coordinate system.

For the first phase of a lane change and for the intermediate phases, the position is predicted with the aid of a second order Euler prediction, and so it holds that:

$$x_V(t+T_p) = v_{x,V}(t) \cdot T_p + \frac{1}{2} \cdot a_{x,V}(t) \cdot T_p^2 \tag{37a}$$

$$y_V(t+T_p) = v_{y,V}(t) \cdot T_p + \frac{1}{2} \cdot a_{y,V}(t) \cdot T_p^2 \tag{37b}$$

In addition, the trajectory of the vehicle 101 is recorded during the first phase of the lane change and is approximated by a third degree polynomial. The polynomial is specified in this case in a lane change coordinate system that is defined in a fashion similar to the characteristic coordinate system 401 for the ambient object 104. Thus, what is involved here is a stationary coordinate system whose origin corresponds to the position of the reference point of the vehicle 101 at the beginning of the lane change, and that is fixed inside the absolute coordinate system 301 for the duration of the lane change. Variables that relate to the lane change coordinate system are marked below with an index "Spur". Thus, the polynomial has the form $$Spur(t)=c_0+c_1 \cdot x_{Spur}(t)+c_2 \cdot x_{Spur}^2(t)+c_3 \cdot x_{Spur}^3(t) \tag{38}$$

The parameters $c_{i,\,i=1},\ldots,3$ are determined by means of a parameter estimation method such as, for example, the recursive DSFI (Discrete Square Root Filter in the Information Form) method. In order to consider the first phase of the lane change completely in this case, the "forgetting factor" of the method is set at $\lambda=1$ such that all the measured values are equally weighted.

It is assumed that the second phase of the lane change runs in mirror image fashion to the first phase. Consequently, the second phase of the lane change can be predicted by the polynomial (38) rotated at the end point of the first phases by 180° and applied at the end point of the intermediate phase. It therefore holds that:

$$y_{Spur}(t+T_p)=y_{Spur,EndZ}+y_{Spur,End1}-[c_0+c_1 \cdot x_H(t+T_p)+ c_2 \cdot x_H^2(t+T_p)+c_3 \cdot x_H^3(t+T_p)] \tag{39}$$

the point ($x_{Spur,End1}$, $y_{Spur,End1}$) specifying the position of the reference point of the vehicle 101 upon conclusion of the first phases of the lane change, and the point ($x_{Spur,EndZ}$, $y_{Spur,EndZ}$) specifying the position of the reference point of the vehicle 101 after conclusion of the intermediate phase of the lane change. The variable $x_H$ is given by $$x_H(t+T_p) = \begin{cases} x_{HH}(t+T_p) & \text{for } x_{HH}(t+T_p) > 0 \\ 0 & \text{otherwise} \end{cases} \tag{40}$$

where $$x_{HH}(t+T_p)+x_{Spur,End1}-(x_{Spur}(t+T_p)-x_{Spur,EndZ}) \tag{41}$$

Here, the x-coordinate $x_{Spur}(t+T_p)$ is calculated with the aid of equation (37a), the result calculated with the aid of the equation being transformed into the lane change coordinate system.

In order to predict the vehicle trajectory in the case of a detected instance of cornering of the vehicle 101, the length of the circular arc traveled and its radius are considered. It has emerged that the circular arc can be approximated as a straight line in order to determine its length. It therefore holds for the length of the circular arc that:

$$\Delta u(T_p) = \sqrt{\left(v_{x,V}(t) \cdot T_p + \frac{1}{2} \cdot a_{x,V}(t) \cdot T_p^2\right)^2 + \left(v_{y,V}(t) \cdot T_p + \frac{1}{2} \cdot a_{y,V}(t) \cdot T_p^2\right)^2} \quad (42)$$

Neglecting the attitude angle, on the basis of a single lane model of the vehicle 101 it holds for an instance of traveling of the vehicle 101 at constant speed on a circle with the radius R that:

$$R = \frac{v^2}{a_{y,V}} \quad (43)$$

Figure 11:
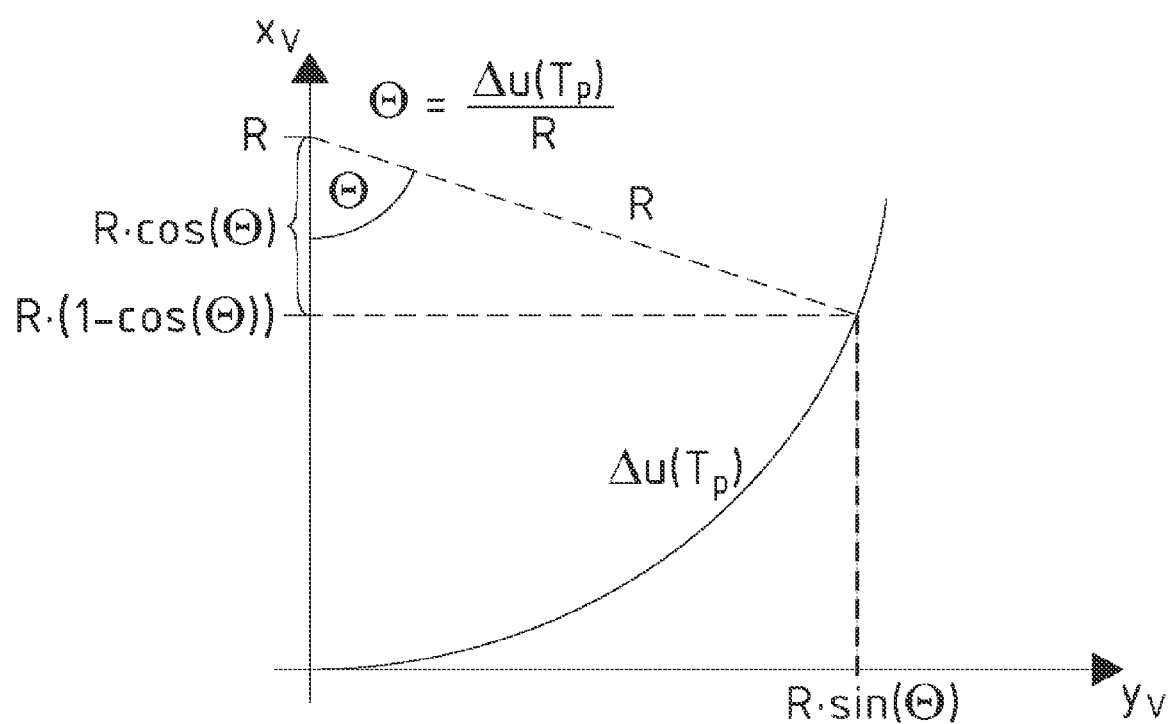
FIG. 11 shows a sketch for illustrating the path prediction for the vehicle in the event of a known instance of cornering.

The speed of the vehicle 101 can, for example, be determined here in turn with the aid of the signals of the wheel speed sensors, and the lateral acceleration $a_{y,v}$ can be determined, for example, with the aid of a lateral acceleration sensor. The predicted coordinates are yielded in the case of an instance of cornering as $$x_V(t + T_p) = R \cdot \sin\left(\frac{\Delta u(T_p)}{R}\right) \quad (44a)$$

$$y_V(t + T_p) = R \cdot \left[1 - \cos\left(\frac{\Delta u(T_p)}{R}\right)\right] \quad (44b)$$

as can be seen from the drawing in FIG. 11. The radius and the curve length are determined with the aid of the equations (42) and (43).

Whether a collision between the motor vehicle 101 and an ambient object 104 is imminent can now be determined with the aid of the predicted movement trajectory of the ambient object 104 detected in the surroundings of the motor vehicle 101, and of the movement trajectory of the motor vehicle 101. To this end, the predicted trajectory of the ambient object 104 is assessed with regard to the trajectory of the reference point of the vehicle 101. A collision course is assumed when the trajectories approach one another up to a separation that considers the width of the vehicle 101 and of the ambient object 104. Furthermore, the so-called time to collision (TTC) is determined, that is to say the duration up to the determined collision with the ambient object 104. If a collision course exists and the collision time undershoots a specific value, there is firstly triggered in one embodiment a driver warning that can, for example, be an optical, acoustic and/or haptic warning. The warning alerts the driver to the dangerous situation so that he can institute measures in good time in order to avoid collision or diminish collision consequences. Particularly when the collision time undershoots a further smaller value, in one embodiment a trigger signal is transmitted to a safety means control system that controls passive safety means such as, for example, airbags or seatbelt pretensioners. The vehicle 101 is preconditioned for a collision by driving the passive safety means appropriately, and so the consequences of the collision for the vehicle occupants are reduced. In a further embodiment, a check is made in a decision direction as a function of the existing driving situation as to whether the collision can be prevented by a braking maneuver, or there is a need to carry out an avoidance maneuver. If it is determined that the collision can be prevented by a braking maneuver, a distance from the collision location is determined at which the braking maneuver must be started. Once the vehicle 101 has reached the determined distance, a brake pressure is automatically built up in the wheel brakes in order to carry out the maneuver. If it is determined that the collision can be prevented by an avoidance maneuver, a trigger signal is transmitted to a path prescribing device. In this embodiment, the trigger signal leads initially to calculation of an avoidance path y(x) inside the path prescribing device in order to prevent the collision with the ambient object 104. The start point at which the avoidance maneuver must be started is then determined as a function of the determined avoidance path in order to be able still just to avoid the ambient object 104. The previously named steps are preferably repeated in time steps until there is no longer any danger of collision on the basis of changes in course of the ambient object 104 or of the vehicle 101, or until the vehicle 101 reaches the start point for an avoidance maneuver. If this is the case, the avoidance path or parameters representing this path is/are transmitted to a steering actuator controller. In one preferred embodiment, the latter then uses a control method to control a steering actuator in such a way that there are set at the steerable wheels of the motor vehicle 101 steering angles that permit the motor vehicle 101 to follow the avoidance path. In a further embodiment, the steering actuator is used in accordance with the calculated path to impress a torque on a steering handle operated by the driver, as a result of which the driver receives a steering recommendation for an avoidance maneuver.

Moreover, the prediction of the trajectories of the ambient object 104 and of the vehicle 101 can be used inside an ACC (ACC: Adaptive Cruise Control) system. This system controls the vehicle speed such that a specific separation from a vehicle driving in front is not undershot. By way of example, the trajectory prediction for the vehicle and the ambient object 104 and the driver's own vehicle 101 can also be used to consider lane change of the ambient object 104 and/or of the vehicle 101 in the case of ACC, the ambient object 104 being a further vehicle. If, for example because of a lane change, such a vehicle is moving into the driving lane of the motor vehicle 101, the speed thereof can already be adapted in good time.

The above-described applications require a sufficiently accurate prediction of the object trajectory. A number of driving situations were simulated in order to demonstrate the improved prediction quality that can be achieved with the aid of the prediction method described above. Since it is possible only with a very large outlay to compare the results of the prediction with a position of an ambient object 104 measured with sufficient accuracy, a different approach was used in this case. Firstly, a few test drives were carried out with a motor vehicle 101. During these test drives, the positions of the vehicle 101 were recorded with reference to the start point; the position of the run-in was determined by the driver. Yaw rate and speed were likewise measured. In an offline simulation, the recorded data records were used as input variables for a sensor simulation model whose output variables have the format of the data of the ambient sensor 102. The simulated sensor data were then used as input variables for a prediction algorithm, use being made, on the one hand, of the previously described prediction algorithm and, on the other hand, of the Euler prediction (equation (1)). The data measured during the test drives were then compared with the predicted data for the two prediction algorithms.

Figure 12A:
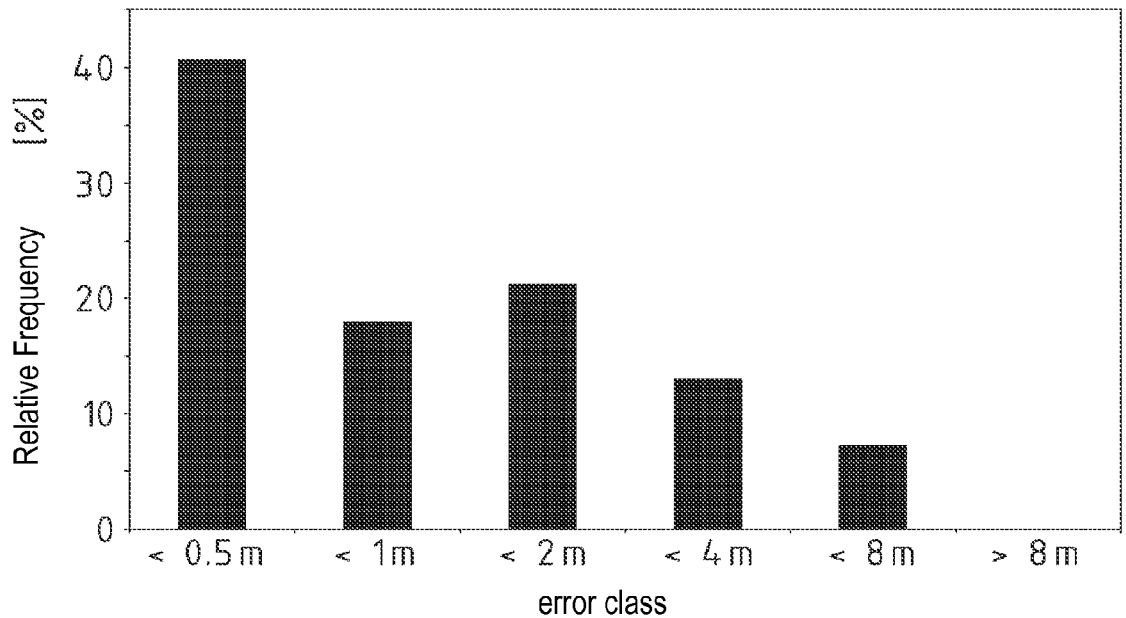
FIG. 12a shows an illustration of the relative frequency of various error classes during prediction with the aid of a method according to the invention.

The results of the comparison between the data are illustrated for the inventive prediction algorithm in FIG. 12a. The error classes of the histogram correspond to intervals for the deviation Δ between the predicted position and the measured position. The classes were selected in this case in accordance with the following qualitative classification:

1) 0<Δ<0.5 m: very good prediction with the aid of which collisions can be reliably forecast.
2) 0.5 m<Δ<1 m: still good prediction, in particular for long prediction times. It is possible to forecast collisions with reduced certainty.
3) 1 m<Δ<2 m: the deviation corresponds approximately to the width of a passenger car or half the length of a passenger car and half the width of a driving lane of a freeway. There is still a limited possibility of forecasting collisions.
4) 2 m<Δ<4 m: the deviation corresponds approximately to the length of a passenger car and the width of a driving lane of a freeway. A collision forecast is not possible with sufficient accuracy in order to institute measures for collision avoidance; however, a driver warning can be issued if a collision is forecast.
5) 4 m<Δ<8 m: the deviation corresponds approximately to twice the length of a passenger car or twice the width of a freeway lane. The prediction is sensible here only in order to obtain an idea of the situation. However, measures for collision avoidance cannot be sensibly instituted.
6) Δ>8 m: the deviations are so large that the prediction results cannot be used sensibly.

Here, FIG. 12a shows, in particular, the results of the comparison in the event of a lane change of the ambient object 104 in the case of which ambient object 104 and vehicle 101 respectively move at a speed of 18 m/s. The ambient object 104 carries out a lane change with a lateral offset of 3.5 m. Since the speeds are virtually constant during the maneuver, only the prediction error of the y-component of the trajectory of the ambient object 104 is assessed. The prediction interval was 3 seconds. As may be seen from the figure, more than 40% of the prediction results are in the error class 0<Δ<0.5 m that is of most use to a collision avoidance system. Furthermore, over 55% of the prediction results the deviation Δ is smaller than 1 m.

Figure 12B:
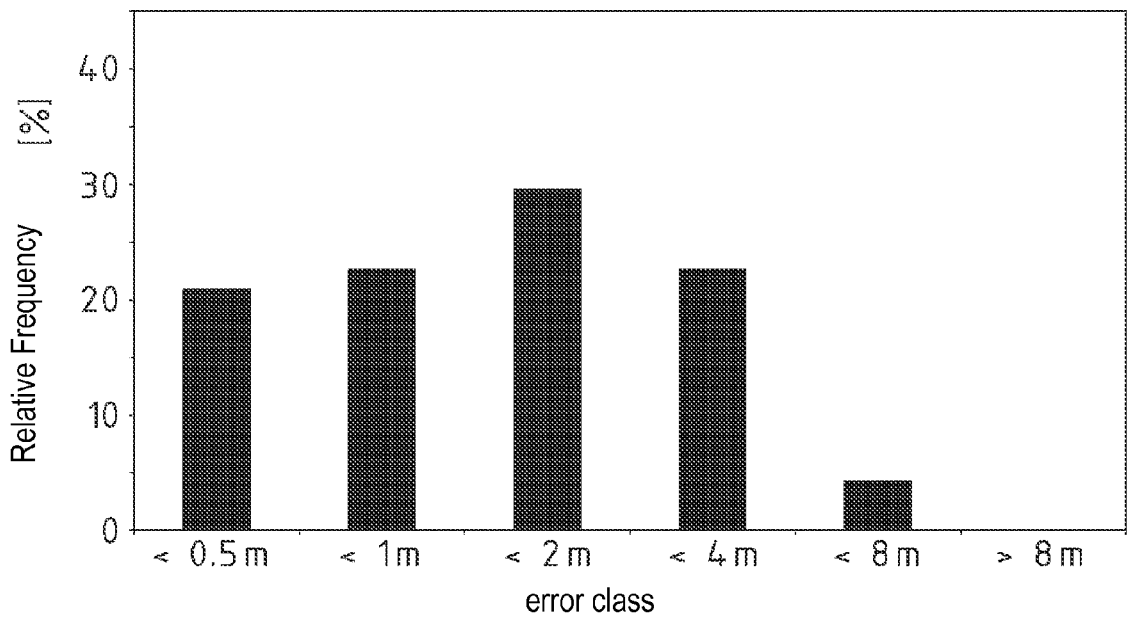
FIG. 12b shows an illustration of the relative frequency of various error classes in the case of Euler extrapolation.

FIG. 12b shows the deviations between the prediction results and the measured positions for the Euler extrapolation. Here, only approximately 21% of the deviations are smaller than 0.5 m, and less than half the deviations are smaller than 1 m. The improvement attained with the aid of the invention is obvious from a comparison of FIGS. 12a and 12b.

The invention claimed is:

1. A method for preventing a collision between a motor vehicle and an ambient object in the surroundings of the motor vehicle, or for diminishing collision consequences, the method comprising:
    operating a driving maneuver detection device for determining movement trajectories of at least one of a motor vehicle and an ambient object based on information received from at least one ambient sensor,
    utilizing the driving maneuver detection device for determining a movement trajectories s executed by at least one of the motor vehicle and the ambient object, wherein the movement trajectories include longitudinal and lateral movement of at least one of the motor vehicle and the ambient object;
    selecting from a set of defined models, a model of the movement of at least one of the motor vehicle and the ambient object as a function of the determined movement trajectories;
    calculating the movement trajectory of at least one of the motor vehicle and the ambient object with the aid of the selected model;
    evaluating the movement trajectories;
    determining a collision location based on the evaluation of the movement trajectories; and instituting measures including the operation of at least one vehicle system for preventing collisions or for diminishing collision consequences as a function of a distance from the collision location.

2. A method for predicting a movement trajectory of an object moving in road traffic, the method comprising:
    operating at least one ambient sensor for determining at least one movement variable of an object (101; 104);
    utilizing a driving maneuver detector for determining a driving maneuver that is executed by the object (101; 104) with an evaluation of the determined at least one movement variable, wherein the driving maneuver includes longitudinal and lateral movement of the object (101;104);
    selecting from a set of defined models, a model of the movement of the object (101; 104) as a function of the determined driving maneuver; and
    calculating the movement trajectory of the object (101; 104)in a prediction device with the aid of the selected model.

3. The method as claimed in claim 2, wherein the driving maneuver of the object (101; 104) is selected from a set of prescribed driving maneuvers.

4. The method as claimed in claim 2, wherein the driving maneuver describing the lateral movement of the object (101; 104) is selected from a set that comprises at least an instance of driving straight ahead, an instance of cornering and a lane change.

5. The method as claimed in claim 2, wherein a distinction is made between an instance of cornering and a lane change with the aid of a characteristic movement variable that is formed from a first movement variable that characterizes a change in the movement direction of the object (101; 104), and at least a second movement variable of the object (101; 104).

6. The method as claimed in claim 5, wherein the second movement variable of the object (101; 104) is a speed of the object (101; 104).

7. The method as claimed in claim 5, characterized in that the second movement variable is a steering angle at steerable wheels of the object (101; 104).

8. The method as claimed in claim 2, wherein the movement trajectory is determined with the model as a function of at least one parameter.

9. The method as claimed in claim 2, wherein a position of the object (101; 104) predicted with the aid of the movement trajectory is compared with a detected position of the object (101; 104), and in that the parameter is adapted as a function of the result of the comparison.

10. The method as claimed in claim 2, wherein the object (101; 104) is an ambient object (104) located in the surroundings of a motor vehicle (101), the movement variable of the ambient object (104) being determined by means of an ambient sensor (102) of the motor vehicle (101).

11. The method as claimed in claim 2, wherein the driving maneuver describing the longitudinal movement of the ambient object (104) is determined as a function of a comparison of speeds of the object (104), present at the successive instants, from a set that comprises at least a steady movement and an instance of emergency braking.

12. The method as claimed in claim 2, wherein a movement direction of the ambient object (104) is determined at successive instants, and in that the driving maneuver describing a lateral movement of the ambient object (104) is determined with a comparison of course angles determined from the determined movement directions.

13. The method as claimed in claim 2, wherein the driving maneuver describing a lateral movement of the ambient object (104) is determined with a comparison of the variable $$(\gamma_{Obj,0}(t)-\gamma_{Obj,0}(t_0))\cdot v_{Obj,0}$$

with at least one threshold value, $\gamma_{Obj,0}(t)$ denoting the course angle at a stationary coordinate system at an observation instant, $\gamma_{Obj,0}(t_0)$ denoting the course angle at the stationary coordinate system at the beginning of a variation in the course angle, and $v_{Obj,0}$ denoting the speed of the ambient object (104).

14. The method as claimed in claim 2, wherein a lane change of the ambient object (104) is determined when the course angle of the ambient object (104) changes to a prescribed extent and when the variable $$(\gamma_{Obj,0}(t)-\gamma_{Obj,0}(t_0))\cdot v_{Obj,0}$$

assumes values within a prescribed interval.

15. The method as claimed in claim 2, wherein an instance of cornering of the ambient object (104) is determined when the course angle of the ambient object (104) changes to a prescribed extent and when the variable $$(\gamma_{Obj,0}(t)-\gamma_{Obj,0}(t_0))\cdot v_{Obj,0}$$

assumes values outside the prescribed interval.

16. The method as claimed in claim 2, wherein the movement trajectory of the ambient object (104) is determined with the aid of a predicted speed of the ambient object (104) and a predicted course angle of the ambient object (104).

17. The method as claimed in claim 2, wherein the movement trajectory of the ambient object (104) is calculated recursively, a position of the ambient object (104) being determined in a prediction step with the aid of the predicted speed and the predicted course angle from the position determined in a preceding prediction step.

18. The method as claimed in claim 2, wherein a predicted speed of the ambient object (104) is calculated with the aid of the selected model describing the longitudinal movement of the ambient object (104).

19. The method as claimed in one claim 2, wherein the predicted course angle of the ambient object (104) is calculated with the selected model describing a lateral movement of the ambient object (104).

20. The method as claimed in claim 2, wherein the predicted course angle of the ambient object (104) is calculated in accordance with a sigmoid function when a lane change has been determined as driving maneuver, the shape of the sigmoid function being determined by at least one parameter that is determined as a function of the speed of the ambient object (104).

21. The method as claimed in claim 2, wherein the course angle $\gamma_{Obj,0}(t+\Delta t)$, predicted for instant $t+\Delta t$, of the ambient object (104) is calculated by $$\gamma_{Obj,0}(t+\Delta t)=\gamma_{Obj,0}(t)+p\cdot\Delta t$$

when an instance of cornering has been determined as driving maneuver, the variable $\gamma_{Obj,0}(t)$ being the course angle of the ambient object (104) at an observation instant t, $\Delta t$ being a time interval and p being a parameter.

22. The method as claimed in claim 2, wherein the object (101; 104) is a motor vehicle (101), the movement variable being detected by means of at least one vehicle sensor.

23. The method as claimed in claim 22, wherein the driving maneuver describing a lateral movement of the motor vehicle (101) is determined with the aid of a yaw rate of the motor vehicle and/or with the aid of a steering angle set at steerable wheels of the vehicle.

24. The method as claimed in claim 2, wherein an instance of driving straight ahead (GAF) of the motor vehicle (101) is determined when at least one of a yaw rate of the vehicle and the steering angle is smaller in absolute terms than a threshold value.

25. The method as claimed in claim 2, wherein an instance of cornering (KUF) of the motor vehicle is determined when the product of steering angle and yaw rate is greater than a prescribed threshold value, or a change in yaw angle during the driving maneuver is greater in absolute terms than a prescribed threshold value.

26. The method as claimed in claim 2, wherein a lane change of the motor vehicle (101) is determined when no instance of driving straight ahead (GAF) and no instance of cornering (KUF) are determined.

27. The method as claimed in claim 2, wherein a lane change is divided into at least three successive phases, the yaw rate of the motor vehicle (101) being greater in absolute terms than a threshold value in a first phase (SW1), being smaller in absolute terms than a threshold value in an intermediate phase (SWZ), and being greater in absolute terms than a threshold value in a second phase (SW2), and the yaw rate in the first phase (SW1) and the second phase (SW2) having a different sign.

28. The method as claimed in claim 27, wherein a maximum duration is prescribed for the first phase (SW1), and in that after a preceding detection of a lane change an instance of cornering (KUF) of the motor vehicle (101) is determined when the duration of the first phase overshoots the maximum duration.

29. The method as claimed in claim 27, wherein a minimum duration is prescribed for the first phase (SW1), and in that after a preceding detection of a lane change an instance of driving straight ahead (GAF) is determined when the duration of the first phase (SW1) undershoots the minimum duration.

30. The method as claimed in claim 27, wherein a maximum duration is prescribed for the intermediate phase (SWZ) of the lane change, and in that after a preceding detection of a lane change an instance of driving straight ahead (GAF) is determined when the duration of the intermediate phase (SWZ) overshoots the maximum duration.

31. The method as claimed in claim 27, wherein a movement trajectory of the motor vehicle (101) for the first phase of a lane change is predicted as a function of determined longitudinal and lateral speeds and/or as a function of determined longitudinal and lateral accelerations of the motor vehicle (101) with the aid of an Euler prediction.

32. The method as claimed in claim 27, wherein the movement trajectory of the motor vehicle (101) during the first phase (SW1) of the lane change is recorded and approximated by a polynomial, and in that the polynomial determined in this case is used to predict the movement trajectory of the motor vehicle (101) for the second phase (SW2) of the lane change.

33. The method as claimed in claim 32, wherein the predicted movement trajectory for the second phase (SW2) of the lane change corresponds to the determined polynomial that is rotated by 180° about an end point of the first phase of the lane change, and that is applied to the movement trajectory of the motor vehicle (101) in the intermediate phase (SWZ) of the lane change.

34. The method as claimed in claim 32, wherein the polynomial is a third degree polynomial.

35. The method as claimed in claim 2, wherein the movement trajectory of the motor vehicle (101) is determined with the aid of a predicted length of a circular arc and a radius of the circular arc when the driving maneuver determined is an instance of cornering (KUF).

36. A method for regulating the speed of a motor vehicle, wherein the speed of the motor vehicle is set so that a separation between the motor vehicle and a further vehicle located ahead of the motor vehicle in a driving direction of the motor vehicle does not undershoot a prescribed separation value, the method comprising:
- operating a driving maneuver detection device for determining at least one movement variable of an object (101; 104) based on information received from at least one ambient sensor;
- determining a driving maneuver that is executed by the object (101; 104) with the aid of an evaluation of the determined movement variable, wherein the driving maneuver includes longitudinal and lateral movement of the object;
- selecting one model from a set of models that represents the movement of the object (101; 104) as a function of the determined driving maneuver;
- predicting a separation between the motor vehicle (104) and the further vehicle (101) as a function of the movement trajectory based on the one model; and
- controlling operation of the motor vehicle for setting the speed of the motor vehicle (101) as a function of the predicted separation.

37. An apparatus for predicting a movement trajectory of an object moving in road traffic, comprising:
- at least one sensor (102) from whose signals it is possible to determine a movement variable of the object (101; 104);
- a driving maneuver detection device (203; 704) that can be used to determine a driving maneuver of the object (101; 104) with an evaluation of the movement variable, wherein the driving maneuver includes longitudinal and lateral movement of the object; and
- a prediction device (2051; . . . ; 205N; 7061; . . .; 706N) used to calculate the movement trajectory of the object (101; 104) with the aid of a model, wherein the model is selected from a set of models as a function of the determined driving maneuver.

* * * * *